US008044108B2

(12) United States Patent
Cooper-White et al.

(10) Patent No.: US 8,044,108 B2
(45) Date of Patent: Oct. 25, 2011

(54) POROUS POLYMER BLEND STRUCTURES

(75) Inventors: Justin John Cooper-White, Upper Brookfield (AU); Yang Cao, St. Lucia (AU); Andrew Stewart Rowlands, Toowong (AU)

(73) Assignees: The University of Queensland (AU); The University of Melbourne (AU)

( * ) Notice: Subject to any disclaimer, the term of this patent is extended or adjusted under 35 U.S.C. 154(b) by 499 days.

(21) Appl. No.: 12/296,177

(22) PCT Filed: Apr. 5, 2007

(86) PCT No.: PCT/AU2007/000464
§ 371 (c)(1),
(2), (4) Date: Oct. 6, 2008

(87) PCT Pub. No.: WO2007/115367
PCT Pub. Date: Oct. 18, 2007

(65) Prior Publication Data
US 2009/0286894 A1 Nov. 19, 2009

(30) Foreign Application Priority Data
Apr. 7, 2006 (AU) .............................. 2006901838

(51) Int. Cl.
C08J 9/28 (2006.01)
C08J 3/02 (2006.01)
(52) U.S. Cl. ................ 521/64; 516/98; 516/99; 521/50; 521/61
(58) Field of Classification Search .................... 521/64, 521/50, 61; 516/98, 99
See application file for complete search history.

(56) References Cited

U.S. PATENT DOCUMENTS

| 3,589,929 | A | 6/1971 | Smolders et al. |
| 4,247,498 | A | 1/1981 | Castro |
| 4,539,256 | A | 9/1985 | Shipman |
| 4,673,695 | A | 6/1987 | Aubert et al. |
| 5,099,060 | A | 3/1992 | Kohn et al. |
| 5,198,507 | A | 3/1993 | Kohn et al. |
| 5,216,115 | A | 6/1993 | Kohn et al. |
| 5,219,564 | A | 6/1993 | Zalpsky et al. |
| 5,395,570 | A | 3/1995 | Kopp et al. |
| 5,587,507 | A | 12/1996 | Kohn et al. |
| 5,658,995 | A | 8/1997 | Kohn et al. |
| 5,660,882 | A | 8/1997 | Mcbride et al. |
| 5,670,602 | A | 9/1997 | Kohn et al. |
| 5,686,091 | A | 11/1997 | Leong et al. |
| 5,847,012 | A | 12/1998 | Shalaby et al. |
| 6,120,491 | A | 9/2000 | Kohn et al. |
| 6,306,424 | B1 | 10/2001 | Vyakarnam et al. |
| 6,331,586 | B1 | 12/2001 | Thielen et al. |
| 6,689,465 | B1* | 2/2004 | Omori et al. ................. 428/402 |
| 2005/0042253 | A1 | 2/2005 | Farrar et al. |
| 2006/0052040 | A1 | 3/2006 | Prasad |

FOREIGN PATENT DOCUMENTS

| WO | 98/36013 | A1 | 8/1998 |
| WO | 99/24391 | A1 | 5/1999 |
| WO | 99/24490 | A1 | 5/1999 |
| WO | 01/36522 | A1 | 5/2001 |
| WO | 01/36522 | A1 | 5/2001 |

OTHER PUBLICATIONS

Hua FJ, Park TG, Lee DS; Elsevier Science Ltd. Jan. 9, 2003; A facile preparation of highly interconnected macroporous poly scaffolds by liquid-liquid phase separation of a PLGA-dioxane-water ternary system. (D5).
Ch. Schugens, V. Maquet, Ch. Grandfils, R. Jerome, and Ph. Teyssie; Journal of Biomedical Materials Research, vol. 30, 449-461 (1996); Polylactide macroporous biodegradable implants for cell transplantation. II. Preparation of Polylactide foams by liquid-liquid phase separation.(D1).
Ruiyun Zhang, Peter X. Ma; Department of Biologic and Materials Sciences, The University of Michigam, Ann Arbor, Michigan 48109-1078; Macromolecular Science and Engineering Center, The University of Michigan, Ann Arbor, Michigan, 48109-1078; Department of Biomedical Engineering, The University of Michigan, Ann Arbor, Michigan 48109-1078; Sep. 16, 1998; Poly/hydroxyapatite porous composites for bone-tissue engineering. I. Preparation and morphology. (D2).
Shin KC, Kim BS, Kim JH, Park TG, Nam JD, Lee DS; Department of Polymer Science and Engineering, Sungkyunkwan University, Suwon, Kyungki 440-746, South Korea; Department of Biological Sciences, Korea Advanced Institute of Science and Technology, Taejon 305-701, South Korea; Feb. 22, 2005; A facile preparation of highly interconnected macroporous PLGA scaffolds by liquid-liquid phase separation II (D4).
Written Opinion of the International Searching Authority, Application No. PCT/AU2007/000465, dated May 11, 2007.
McGuire K.S., et al, Polymer 1994:35(20);4404-7.
Flory P.J. et al., American Chemical Society 1964; 86(17)3507-14.
Extended European Search Report, Dated Aug. 6, 2010, Application No. 07718712.8.
International Preliminary Report on Patentability, Application No, PCT/AU2007/000465, dated Oct. 8, 2008.
Reed et al., Trans. Am. Soc. Artif. Intern. Organs, p. 109 (1977). PCT/US98/036013.
U.S. Appl. No. 09/56,050, filed Apr. 7, 1998; Patent No. 6,120,491.
Flory P.J., Principles of polymer chemistry, Ithaca: Cornell Univeristy press, 1953.

(Continued)

Primary Examiner — Timothy J. Kugel
(74) Attorney, Agent, or Firm — Dobrusin & Thennisch PC

(57) ABSTRACT

A porous polymer blend, and a method of producing a porous polymer blend from at least two immiscible polymers. The at least two immiscible polymer being blended together and exhibiting the absence of complete phase separation. The method of producing a porous polymer blend comprising: forming a liquid composition comprising at least two immiscible polymers dissolved in a common solvent; subjecting the liquid composition to a reduction in temperature to cause at least two immiscible polymers to phase separate into a common polymer rich phase and a common polymer poor phase; solidifying the at least two immiscible polymers in the common polymer rich phase so as to avoid complete phase separation of the at least two immiscible polymers; and removing the common polymer pore phase to provide a blend of the at least two immiscible polymers having a porous morphology.

27 Claims, 6 Drawing Sheets

OTHER PUBLICATIONS

Olabisi O., Polymer-polymer miscibility, New York: Acadamic Press 1979.
Lloyd D.R. et al., Journal of membrane Science 1991; 64(1-2):1-11.
Kim S.S. et al., Polymer 1992; 33(5):1047-57.
Flory P.J., "Discussions of the Faraday Society," 1970; No. 49(7-29).
Remington's Pharmaceutical Science, Mac Publishing Co., (A.R. Gennaro edt. 1985).
Nathan et al., Bio. Cong. Chem., 4, 54-62 (1992).
Nathan, Macromolecules, 25 4476 (1992).
International Search Report, Serial No. PCT/AU2007/000464, dated Aug. 8, 2007.
Written Opinion of the International Searchhing Authority, Application No. PCT/AU2007/000464, dated Aug. 8, 2007.
International Preliminary Report on Patentability, Application No. PCT/AU2007/000464, dated Oct. 8, 2008.
Copending U.S. Appl. No. 12/296,178.
Matsuyama H; Okafuji H; Maki T; Toramoto M; Tsujioka N; "Membrane formation via thermally induced phase separation in polypropylene/diluent system" Journal of Applied Polymer Science, vol. 84, Mar. 6, 2002, pp. 1701-1708.
Hua F J; Kim G E; Lee J D; Son Y K; Lee D S: "Macroporous poly (L-lactide) Scaffold 1. Preparation of a macroporous scaffold by liquid-liquid phase separation of a PLLA-dioxane-water system" Journal of Biomedical Materials Research, vol. No. 2, Jan. 1, 2002, pp. 161-167.
Yoon Sung Nam et al: "Porous Biodegradable Polymeric Scaffolds Prepared by Thermally Induced Phase Separation" Journal of Biomedical Materials Research, Wiley, New York, NY, US LNKD-Dol:10.1002/ (SICI) 1097-4636 (199910) 47:1 8::AID-JBM2 3.0. CO;2-L, vol. 47, No. 1, Jan. 1, 1999, pp. 8-17, XP008008161 ISSN: 0021-9304.
Supplementary European Search Report, dated Aug. 23, 2010, EP Application No. 07 71 8711.

* cited by examiner

POROUS POLYMER BLEND STRUCTURES

CLAIM OF BENEFIT OF FILING DATE

The present application claims the benefit of the filing date of PCT Application Serial No. PCT/AU2007/000464 (filed 5 Apr. 2007) (Published as WO 2007/115367) and AU 2006901838 (filed 7 Apr. 2006), the contents of which are hereby incorporated by reference in their entirety.

FIELD OF THE INVENTION

The present invention relates generally to polymer blends having a porous morphology and to a method for preparing the same. The porous polymer blend structures are particularly suitable for use in tissue engineering, and it will therefore be convenient to describe the invention with an emphasis toward this application. However, it is to be understood that the porous polymer blend structures may be used in various other applications.

BACKGROUND OF THE INVENTION

As a result of their high surface area, large pore volume and/or pore size selectivity, porous polymer structures have found wide application in many technological fields. For example, porous polymers may be used as separation or filtration materials, as absorbent materials and as scaffolds for catalysis, immobilisation of pharmaceutical compounds or biological molecules and tissue engineering.

The wide applicability of porous polymer structures is also very much reliant upon the different physical and chemical properties of the polymer materials from which they can be derived. For example, to enable porous polymer structures to function effectively in liquid separation and filtration applications it will be important that they are formed from polymer materials that are not chemically degraded or dissolved by the contacting liquid(s). The polymer material should also maintain adequate mechanical properties upon being exposed to the contacting liquid(s). In the case of tissue engineering applications, it will generally be important that polymer materials are biocompatible, and it may also be desirable that the polymer materials maintain good mechanical properties in vivo for a considerable period of time but subsequently biodegrade.

Despite there being a diverse array of polymers with different physical and chemical properties that may be used to form porous polymer structures, there are invariably applications that would best be served using a porous polymer structure having properties characteristic of two or more different polymer materials. For example, it may be desirable that a porous polymer structure has the rigidity of polystyrene and the hydrophilicity of polyacrylic acid. An idealistic approach to solving this problem might be to prepare porous polymer structures from a blend of two or more different polymers, for example a blend of polystyrene and polyacrylic acid. However, those skilled in the art will appreciate that most polymers do not often form a compatible polymer blend. In other words, blending different polymer materials generally results in the formation of an immiscible polymer blend.

Immiscible polymer blends are typically characterised by a phase separated morphology. The nature of the phase separated morphology is primarily dictated by the relative proportions of the polymers present. For example, a phase separated polymer blend of approximately equal proportions of polymers A and B will generally provide a bi-continuous morphology. Where the proportion of polymer A in the immiscible polymer blend is higher than polymer B, the polymer blend will generally have a discontinuous morphology with polymer A being the continuous phase and polymer B being the discontinuous phase. Conversely, where the proportion of polymer B in the immiscible polymer blend is greater than polymer A, the polymer blend will generally have a discontinuous morphology with polymer B being the continuous phase and polymer A being the discontinuous phase.

Despite comprising polymers that may individually have desirable properties, immiscible polymer blends often exhibit inferior properties relative to the individual polymer components alone. Such inferior properties are believed to stem primarily from minimisation of the interfacial surface area between the immiscible polymers during phase separation which affords relatively coarse phase separated domains. The coarse phase separated domains of the blend in turn result in interphase interfaces that are compositionally sharp and mechanically weak. The inferior properties of such immiscible polymer blends are often exacerbated when they are formed into high surface area products such as porous polymer structures.

Numerous techniques for improving the properties of immiscible polymer blends have been developed. Perhaps the most effective and widely studied of these techniques has been the use of compatibilisers to modify the phase separate morphology of the polymer blends. Compatibilisers are generally polymeric materials that have a degree of miscibility in each of the phase separated domains and can therefore function as a bridge between them. This bridging function reduces the interfacial energy between the domains and enables them to be more finely dispersed or intermixed. This in turn improves the properties of the resulting blend.

Although the use of compatibilisers can promote better intermixing between immiscible polymers to afford blends that exhibit improved properties, each compatibiliser is typically blend specific and not suitable for use with other polymer blends. Furthermore, the process of developing an effective compatibiliser for a particular polymer blend can be quite difficult.

It would therefore be desirable to develop a method for preparing porous polymer structures from immiscible polymer blends that was not reliant upon the need to use compatibilisers, and yet could promote intimate mixing between the immiscible polymers to impart improved properties to the porous structure.

SUMMARY OF THE INVENTION

The invention provides a method for preparing a porous polymer blend, the method comprising:
  forming a liquid composition comprising at least two immiscible polymers dissolved in at least one common solvent;
  subjecting the liquid composition to a reduction in temperature to cause the at least two immiscible polymers to phase separate into a common polymer rich phase and a common polymer poor phase;
  solidifying the at least two immiscible polymers in the common polymer rich phase so as to avoid complete phase separation of the at least two immiscible polymers; and
  removing the common polymer poor phase to provide a blend of the at least two immiscible polymers having a porous morphology.

The invention also provides a porous polymer blend prepared in accordance with the method defined in the immediately preceding paragraph. Porous polymer blends prepared in accordance with this method can advantageously be formed with varying degrees of intermixing between the immiscible polymers. In particular, the polymer blends have been found to exhibit intermixing between the immiscible polymers on a molecular level. When examined the blended polymer or blended section of the combined polymers do not exhibit one polymer phase distributed through another polymer phase. There is no phase boundary between the blended polymers apart from the pore boundary produced by the removal of polymer poor phase. In other words, the blends exhibit intermixing between the immiscible polymer chains per se. This being in contrast with the effect typically achieved using compatibilisers where phase separated domains are simply more finely dispersed.

Without wishing to be limited by theory, the ability to prepare porous polymer blends from immiscible polymers such that they exhibit intermate mixing between the immiscible polymer chains is believed to result through the immiscible polymers phase separating into a common polymer rich phase. The common polymer rich phase also comprises at least some of the common solvent which functions to maintain the at least two immiscible polymers collectively in a single phase. The at least two immiscible polymers in the common polymer rich phase are then solidified so as to avoid their complete phase separation to provide a solid polymer phase in which at least a proportion of the two immiscible polymers are intermixed on a molecular level. Removal of the common polymer poor phase then provides the porous structure of the immiscible polymer blend.

Solidification of the at least two immiscible polymers in the common polymer rich phase in the manner described is believed to "fix" the immiscible polymers into a thermodynamically unfavourable intimately blended state. Through manipulation of the solidification process it has been found that the degree of intermixing between the immiscible polymers can be varied. For example, rapid solidification of the common polymer rich phase can minimise if not avoid the formation of interfacial boundaries and primarily result in intermixing between the immiscible polymers on a molecular level. A slower rate of solidification can provide an opportunity for the immiscible polymers to develop interfacial boundaries and therefore form a polymer blend in which only a proportion of the immiscible polymers are intermixed on a molecular level.

In accordance with a second aspect of the invention there is provided a porous polymer blend comprising at least two immiscible polymers, the two immiscible polymers being characterised by being unable to form a homogeneous polymer mixture in the absence of a solvent, the at least two immiscible polymer being blended together and exhibiting the absence of complete phase separation.

The absence of complete phase separation is recognised by the absence of glass transition temperatures (recorded for the blend using, for example, differential scanning calorimetry) which are identical to those of the pure polymers for each component polymer within the blend. That is, for example, a blend of polymers A and B which are completely phase separated will display two discrete glass transition temperatures which are identical to the glass transition temperatures of the pure polymers A and B alone. In addition, the absence of complete phase separation is recognised by the absence of discrete phase boundaries when inspected by spectroscopic techniques, such as energy-dispersive X-ray spectroscopy, or microscopic techniques, such as scanning and transmission electron spectroscopy.

The porous polymer blend structure may be formed according to the method described above.

BRIEF DESCRIPTION OF THE DRAWINGS

Embodiments of the invention will now be described by way of example with reference to the accompanying drawings in which.

DESCRIPTION OF THE PREFERRED EMBODIMENTS

Figure 1:
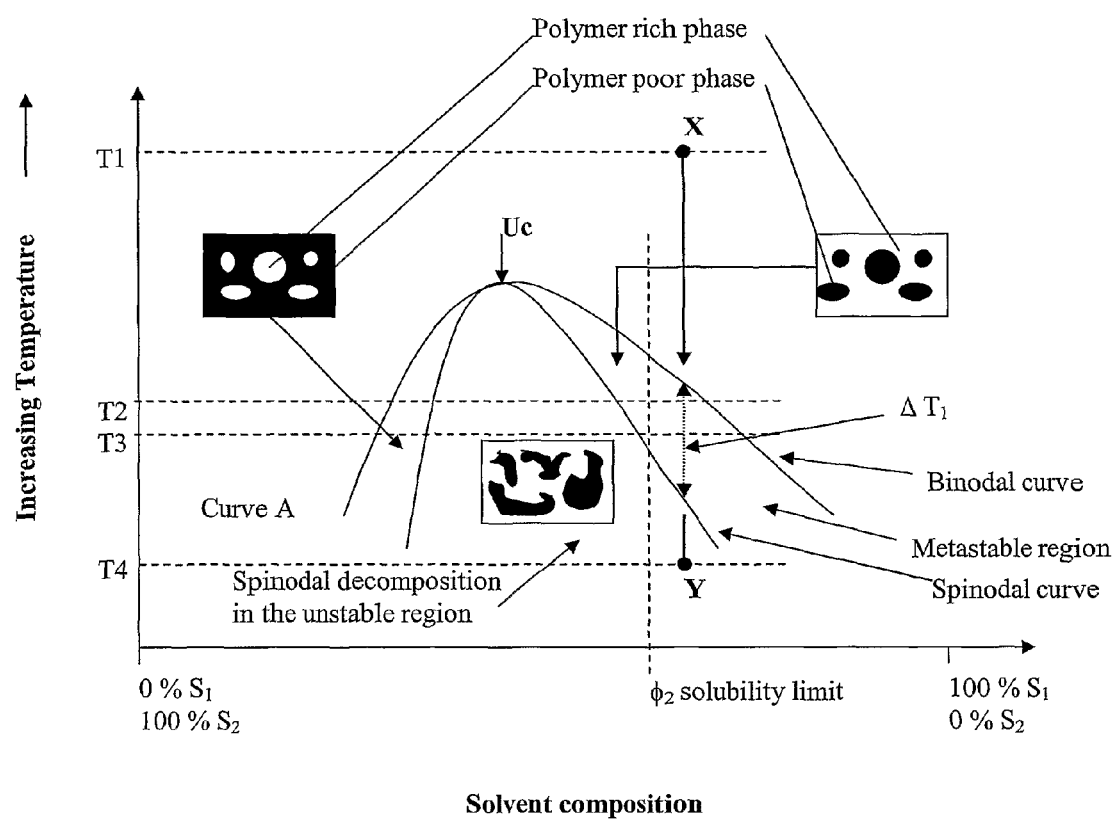
FIG. 1 depicts a typical polymer solution phase diagram for a polymer-solvent/non-solvent system at a nominal polymer concentration.

For avoidance of any doubt, unless otherwise stated the expression "porous polymer blend" used herein is intended to refer to a mixture of two or more polymers that form a polymer composition (ie. the "polymer blend") having voids or pores therein. The polymer blend per se which forms the porous polymer structure may itself also be permeable, for example to liquids and/or gases.

In accordance with the invention, at least two immiscible polymers are dissolved in at least one common solvent. As indicated above, all but very similar polymer materials are generally immiscible with each other. Those skilled in the art will appreciate that two polymers will generally be considered "immiscible" if, upon being melt mixed, they do not form a homogeneous polymer mixture when molten or upon solidifying.

On this basis, the miscibility or immiscibility of a given pair of polymers may be determined using techniques well known in the art. For example, the two polymers may be melt mixed and the presence or absence of phase separated domains in the blend determined using microscopy techniques such as scanning or transmission electron microscopy (SEM or TEM, respectively). The glass transition temperature(s) (Tg) of a blend of two polymers can also be measured by Differential Scanning Calorimetry (DSC) and used as a guide to determine whether the polymers are immiscible. In this case, if the polymer blend is found to have two Tgs, then the polymers are likely to be immiscible. On the other hand, if only one Tg for the polymer blend is observed, then the polymers are likely to be miscible.

It may of course be possible to force two polymers that are otherwise immiscible to become miscible by subjecting them to high temperature and pressure. However, while being forced to be miscible under these extreme conditions, such a polymer blend will typically phase separate upon being allowed to cool naturally to room temperature.

A particularly important feature of the invention is that the at least two immiscible polymers are dissolved in at least one common solvent. In this context, the term "common solvent" is intended to mean a material or combination of materials, which is capable of dissolving each of the at least two immiscible polymers. Those skilled in the art will appreciate that at a fixed volume and temperature, certain solvents will be capable of dissolving more polymer than others. It will also be appreciated that the solvating ability of a given material can be greatly influenced by temperature and pressure. Thus, from a practical point of view, a "common solvent" suitable for use in accordance with the invention will be a material or a combination of materials that is capable of dissolving a sufficient amount of the at least two immiscible polymers to enable the porous polymer blend to be formed. Conversely, a "non-solvent" will be a material or a combination of materials that is not capable of dissolving a sufficient amount of the at least two immiscible polymers to enable the porous polymer blend to be formed.

As a convenient point of reference only, in the context of the present invention a person skilled in the art might consider a material(s) a "solvent" if at the required temperature it is capable of dissolving at least 0.5% (w/v) in total of the at least two immiscible polymers. Conversely, a material might be considered a "non-solvent" if at the required temperature it is not capable of dissolving at least 0.5% (w/v) in total of the at least two immiscible polymers. Preferably, the common solvent will be capable of dissolving at least 1, more preferably at least 2, most preferably at least 5% (w/v) in total of the at least two immiscible polymers.

Provided that the porous polymer blend structures can be formed, a proportion of the immiscible polymer(s) may remain undissolved in the liquid composition.

While most suitable solvents will be in a liquid state at ambient temperatures, solvents which are solid at room temperature may also be employed so long as the liquid composition comprising the two or more immiscible polymers can be formed at elevated temperatures and solidification of the solvent does not interfere with the formation of the porous polymer blend structure. More specifically, a "solid solvent" may be used so long as the immiscible polymers can be phase separated into the common polymer rich phase.

Through an understanding of properties such as the polarity, hydrophilicity and hydrophobicity of the relevant solvent and immiscible polymers, a person skilled in the art should be able to readily select an appropriate common solvent for a given set of immiscible polymers. The selection of a suitable common solvent might be facilitated by considering solvent-polymer interaction parameters for the immiscible polymers of interest. Thus, a solvent which affords a sufficiently low and similar interaction parameter for the selected immiscible polymers is likely to function as a common solvent for these polymers. It will be appreciated that such solvent-polymer interaction parameters vary with temperature, and it may be possible to improve the "solvating power" of a given solvent simply by raising its temperature. A suitable common solvent for a given set of immiscible polymers may also be identified through simple trial and error.

Those skilled in the art will appreciate that solvent-polymer interaction parameters may also be used as a guide in determining whether a material is likely to function as a solvent or a non-solvent for a given polymer. Thus, high interaction parameters are indicative of non-solvent properties, whereas low interaction parameters are indicative of good solvent properties.

As for the chemical nature of suitable common solvents, particular classes of various organic compounds have been found useful, including aliphatic and aromatic acids, aliphatic, aromatic and cyclic alcohols, aldehydes, primary and secondary amines, aromatic and ethoxylated amines, diamines, amides, esters and diesters, ethers, ketones and various hydrocarbons and heterocycles. Despite the diverse array of potentially suitable solvents, those skilled in the art will appreciate that the suitability of a particular solvent can be quite selective. Thus, for example, not all aromatic acids will be useful as a solvent for a given polymer and, further, not all solvents useful to dissolve a polymer such as polyethylene will necessarily be useful to dissolve a polymer such as polyvinylchloride.

The ratio of the at least one common solvent to the total amount of the dissolved at least two immiscible polymers used in accordance with the invention will vary depending upon the selected operating temperature, the type of solvent(s) and polymers selected, and also the desired morphology and application of the resultant porous polymer blend structure. Thus, where a more dense porous polymer blend structure is required the polymers and solvent(s) should be selected to provide a liquid composition having a relatively high dissolved polymer concentration. Conversely, where a highly porous low density porous polymer blend structure is required, the polymers and solvent(s) should be selected to provide a liquid composition having a relatively low dissolved polymer concentration.

Generally, the total amount of immiscible polymers dissolved in the liquid composition will range from about 0.5 to about 50, preferably from about 1 to about 20, more preferably from about 1 to about 10, most preferably from about 2 to about 10 weight percent relative to the total volume of the liquid composition.

The ratio of each of the at least two immiscible polymers that may be dissolved in the at least one common solvent may vary. For example, where two immiscible polymers are dissolved in the at least one common solvent, the weight ratio of the first to second immiscible polymers may range from 0.0001:99.9999 through to 99.9999:0.0001. Thus, only a relatively small amount of one of the immiscible polymers can be present. It has been found that such small amounts of one of the immiscible polymers can readily modify the properties of the other immiscible polymer(s). The relative weight % ration of the at least two immiscible polymers may also range from 0.01:99.99 through to 99.99:0.01, preferably from 0.1:99.9 through to 99.9:0.1, more preferably from 1:99 through to 99:1, most preferably from 10:90 through to 90:10. Generally, all dissolved immiscible polymers will be present in an amount greater than 0.0001, preferably greater than 0.1, more preferably greater than 1 weight percent, relative to the total mass of dissolved polymer present.

In performing the method of the invention it may be desirable to include a non-solvent in the liquid composition to facilitate the formation of the phase separated composition. The addition of a non-solvent will generally cause an increase in the interaction parameter between the common solvent and the immiscible polymers and facilitate phase separation of the liquid composition. The non-solvent will generally be selected such that it is miscible with the at least one common solvent. It will be appreciated that as the proportion of non-solvent in the liquid composition is increased, the solubility of the at least two immiscible polymers in the liquid composition will correspondingly be decreased. It will also be appreciated that a material which functions as a solvent for one polymer may function as a non-solvent for another polymer, and vice versa. Thus, when a non-solvent is to be used in accordance with the method of the invention it can be selected using the general principles outlined above.

Where the invention is employed to prepare a porous polymer blend structure for use in tissue engineering applications a number of further criteria may be considered in selecting a suitable common solvent or common solvent/non-solvent combination. Generally, such solvents/non-solvents should have low toxicity and be capable of being thoroughly removed from the resulting porous polymer.

Examples of suitable common solvents, or non-solvents as the case may be, that may be used to prepare the porous polymer blend structures include, but are not limited to, dimethyl oxalate (DMO), ethylene carbonate (EC), N-methyl acetamide (NMA), dimethyl sulfoxide (DMSO), acetic acid (AA), 1,4-dioxane (DO), dimethyl carbonate (DMC), chloroform, dichloromethane (DCM), naphthalene, sulfalene, trimethylurea, ethylene glycol or other glycols and polyglycols, N-methylpyrrolidone (NMP), ethylene carbonate, hexane, trifluoroethanol (TFE), ethanol, acetic acid, and water, and combinations thereof.

Given the diverse array of polymers that may be used in accordance with the invention, it will be appreciated that it would be impractical to provide a comprehensive list of immiscible polymer combinations that may be used. Nevertheless, having regard to the general guidelines set forth above for determining whether a combination of polymers are immiscible, suitable polymers in general can be broadly classified as thermoplastic polymers. Suitable polymers can also exhibit a limited degree of cross-linking provided that they can still be dissolved in the common solvent.

Suitable polymers include, but are not limited to, low density polyethylene, high density polyethylene, polypropylene, polystyrene, polyacrylic acid and copolymers of polyacrylic acid and polystyrene, polyurethane, polyvinylchloride, polyvinylflouride, acrylonitrile-butadiene-styrene terpolymers, styrene-acrylonitrile copolymers, styrene butadiene copolymers, poly(4-methyl-pentene-1), polybutylene, polyvinylidene chloride, polyvinyl butyral, polyvinyl imidazole, chlorinated polyethylene, polyethylene oxide, ethylene-vinyl acetate copolymers, polyvinyl acetate, polyvinyl alcohol, polymethyl-methacrylate, polymethyl-acrylate, ethylene-acrylic acid copolymers, ethylene-acrylic acid metal salt copolymers, chlorosulphonate polyolefins, polyesters such as polyethylene teraphthalate and polybutylene teraphthalate, polyamides such as Nylon 6, Nylon 11, Nylon 13, Nylon 66, polycarbonates and polysulfones, and polyarylene and polyalkylene oxides; agrose, cellulose, gelatin, alginate, elastin, Chitosan, poly(lactide)s, poly(glycolide)s, poly(lactide-co-glycolide)s, poly(lactic acid)s, poly(glycolic acid)s, poly(lactic acid-co-glycolic acid)s, polycaprolactone, polycarbonates, polyesteramides, polyanhydrides, poly(amino acids), polyorthoesters, poly(hydroxyalkanoates), polyacetyls, polycyanoacrylates, polyetheresters, poly(esters), poly(dioxanone)s, poly(alkylene alkylate)s, copolymers of polyethylene glycol and polyorthoester, poly(hydroxy acids), poly(lactones), poly(amides), poly(ester-amides), poly(amino acids), poly(anhydrides), poly(ortho-esters), poly(carbonates), poly(phosphazines), poly(thioesters), polysaccharides and mixtures, blends and copolymers thereof.

The method of the invention is particularly suitable for making porous polymer blend structures that may be used in tissue engineering applications. Polymers used in tissue engineering applications will generally be biocompatible and are preferably biodegradable. In addition to acting as adhesive substrates for cells, such polymers should also promote cell growth and allow retention of differentiated cell function, possess physical characteristics allowing for large surface to volume ratios, have sound mechanical properties and have an ability to be formed into complex shapes, such as for bone or cartilage substitutes.

Mechanical rigidity is an important property of polymers used in tissue engineering applications. Relatively high rigidity is advantageous to enable the porous polymer blend structure to withstand the contractile forces exerted by cells growing within the structure. The resulting porous polymer blend structure should also be rigid enough to maintain the desired shape under in vivo temperatures. Accordingly, the glass transition temperature(s) (Tg), as measured by Differential Scanning Calorimetry (DSC), of the polymer blend per se is preferably sufficiently high that the network of pores in the polymer structure does not collapse in vivo. A further parameter to consider when selecting a polymer for use in tissue engineering applications is the biodegradation kinetics of the polymer. In particular, it may be desirable that the biodegradation kinetics of the polymer match the healing rate associated with the specific in vivo application.

Examples of suitable polymers that may be used to make porous polymer blend structures for use in tissue engineering applications include, but are not limited to, aliphatic or aliphatic-co-aromatic polyesters including poly($\alpha$-hydroxyesters) and copolymers thereof such as polyglycolic acid (PGA), polylactic acid (PLA), poly(lactic-co-glycolic acid) (PLGA), PLGA-co-poly-L-Lysine (PLGA-co-PLL), and all stereo-isomeric forms thereof; polydioxanone; polyalkanoates such as poly(hydroxy butyrate) (PHB), poly(hydroxy valerate) (PHV) and copolymers thereof (PHBV); and polyethylene oxide/polyethylene terephthalate as disclosed by Reed et al., in *Trans. Am. Soc. Artif. Intern. Organs*, page 109 (1977). Other suitable polymers include biodegradable and biocompatible polycaprolactones, and copolymers of polyesters, polycarbonates, polyanhydrides, poly(ortho esters), and copolymers of polyethylene oxide/polyethylene terphthalate.

Bisphenol-A based polyphosphoesters have also been suggested for use in biodegradable porous polymer design. Such polymers include poly(bisphenol-A phenylphosphate), poly(bisphenol-A ethylphosphate), poly(bisphenol-A ethylphosphonate), poly(bisphenol-A phenylphosphonate), poly[bis(2-ethoxy)hydrophosphonic terephthalate], and copolymers of bisphenol-A based poly(phosphoesters). Although these polymers have been suggested in U.S. Pat. No. 5,686,091, the known cytotoxicity of bisphenol-A makes them less preferred candidates for implantation.

Other polymers suitable for use in tissue engineering applications include polymers of tyrosine-derived diphenol compounds. Methods for preparing the tyrosine-derived diphenol monomers are disclosed in U.S. Pat. Nos. 5,587,507 and 5,670,602. The preferred diphenol monomers are des-amino-tyrosyl-tyrosine (DT) esters. These monomers have a free carboxylic acid group that can be used to attach a pendent chain. Usually, various alkyl ester pendent chains are employed, for example, ethyl ester, butyl ester, hexyl ester, octyl ester and benzyl ester pendant chains.

The tyrosine-derived diphenol compounds are used as monomeric starting materials for polycarbonates, polyiminocarbonates, polyarylates, polyurethanes, polyethers, and the like. Polycarbonates, polyiminocarbonates and methods of their preparation are disclosed in U.S. Pat. Nos. 5,099,060 and 5,198,507. Polyarylates and methods of their preparation are disclosed in U.S. Pat. No. 5,216,115. Block copolymers of polycarbonates and polyarylates with poly(alkylene oxides) and methods of their preparation are disclosed in U.S. Pat.

No. 5,658,995. Strictly alternating poly(alkylene oxide ether) copolymers and methods of their preparation are disclosed in WO99/24490.

Other polymers suitable for use in tissue engineering applications include the polycarbonates, polyimino-carbonates, polyarylates, polyurethanes, strictly alternating poly(alkylene oxide ethers) and poly(alkylene oxide) block copolymers polymerised from dihydroxy monomers prepared from $\alpha$-, $\beta$- and $\gamma$-hydroxy acids and derivatives of tyrosine. The preparation of the dihydroxy monomers and methods of their polymerisation are disclosed in International Patent Application No. PCT/US98/036013.

Polycarbonates, polyimino carbonates, polyarylates, poly (alkylene oxide) block copolymers and polyethers of the diphenol and dihydroxy tyrosine monomers that contain iodine atoms or that contain free carboxylic acid pendent chains may also be employed. Iodine-containing polymers are radio-opaque. These polymers and methods of preparation are disclosed in WO99/24391. Polymers containing free carboxylic acid pendent chains and methods of preparation are disclosed in U.S. patent application Ser. No. 09/56,050, filed Apr. 7, 1998.

A particular advantage of the present invention is that polymers previously considered not particularly suitable for use in tissue engineering applications may be rendered suitable. In particular, by blending an otherwise unsuitable polymer with a suitable polymer using the method of the present invention, it has been found that the resulting polymer blend may be used in tissue engineering applications. For example, the bio-compatibility of polyurethane can be enhanced by forming a blend with a poly($\alpha$-hydroxyester) in accordance with the invention. The resulting polymer blend can advantageously exhibit excellent physical and mechanical properties due to the presence of minimal or even no, interfacial boundaries between the blended polymers. Accordingly, all polymers previously mentioned may find use in tissue engineering applications.

The porous polymer blends prepared in accordance with the invention may exhibit physical and chemical properties characteristic of each of the two or more immiscible polymers that form the polymeric structure. However, by virtue of the ability to promote molecular mixing of the two or more immiscible polymers, the porous polymer blend may also exhibit physical and chemical properties that are unique relative to each polymer from which the structure is formed.

Examples of specific immiscible polymers/common solvent combinations that may be used in accordance with the invention include, but are not limited to, polyurethane, PLGA and DMSO; PLGA, Agarose and DMSO; PLGA, cellulose and DMSO; PLGA, alginate and DMSO; PLGA, PCL and DMSO; PLGA, Chitosan and DMSO; PLGA, PLGA-PLL and dioxane; PLGA, PLA and DMSO; PLA, Chitosan and DMSO; PLA, elastin and ethyl carbonate; PLGA, elastin and ethyl carbonate; PLA, elastin and acetic acid; PLGA, elastin and acetic acid; PLGA, elastin and acetic acid; and PLGA, elastin and dioxane.

Examples of specific porous polymer blend structures comprising at least two immiscible polymers that are intermixed on a molecular level therefore include, but are not limited to, those based on polyurethane and PLGA, PLGA and agarose, PLGA and cellulose, PLGA and alginate, PLGA and PCL, PLGA and chitosan, PLGA and PLGA-PLL, PLGA and PLA, PLA and chitosan, PLA and elastin, and PLGA and elastin.

The liquid composition may also comprise other components such as one or more other polymers, solid and/or semi-solid particulate materials, and additives, provided that such components do not adversely affect the ability to prepare the porous polymer blend structure. The function and nature of these further components will be discussed in more detail below.

The liquid composition used in accordance with the invention will generally be prepared by heating the at least two immiscible polymers and the at least one common solvent with mixing to a temperature required to dissolve a sufficient amount of the polymers in the solvent. Preferably, substantially all of the polymers used will be dissolved in the solvent. In some circumstances, it may be desirable to dissolve each of the immiscible polymers separately into a portion of the common solvent and then mixing the dissolved polymers to settle to form the liquid composition. More preferably the liquid composition is formed and held at a temperature above the binodal temperature of the at least two immiscible polymers. It is also preferred that the at least two immiscible polymers are dissolved in the at least one common solvent to form a homogenous liquid.

To prepare the porous polymer blend structure in accordance with the present invention the liquid composition forms a phase separated composition. This is achieved by subjecting the liquid composition to a reduction in temperature. Importantly, the reduction in temperature must cause the at least two immiscible polymers to phase separate into a common polymer rich phase and a common polymer poor phase.

Those skilled in the art will have a good understanding of what is intended by the expressions "polymer rich" and "polymer poor" in the context of phase separated solvent/polymer compositions. In general, as part of the phase separation process, dissolved polymer will typically preferentially separate with the phase in which it is more soluble resulting in a polymer rich phase and a polymer poor phase. In accordance with the method of the present invention, the at least two immiscible polymers phase separate into a "common" polymer rich phase and a "common" polymer poor phase. Use of the term "common" in this context is intended to mean that the immiscible polymers phase separate into the same polymer rich phase and the same polymer poor phase. This being in contrast to a situation where each of the immiscible polymers sequentially phase separate into different polymer rich and polymer poor phases.

Provided that the porous polymer blend can be formed, there is no particular limitation on the percentage of polymer that needs to be present in the common polymer rich phase, relative to that present in the common polymer poor phase. However, as a convenient point of reference only, a common polymer rich phase is likely to comprise at least 50 wt %, if not greater than 60-70 wt %, of the total amount of dissolved polymer in the liquid composition.

The rate at which the temperature of the liquid composition is reduced is believed to be an important parameter for causing the at least two immiscible polymers to phase separate into a common polymer rich phase and a common polymer poor phase. In particular, it is believed that the rate of cooling should be sufficient to promote spinodal decomposition of at least a proportion of the liquid composition.

As will be discussed in more detail below, provided that at least some spinodal decomposition of the liquid composition occurs (to thereby cause phase separation of the immiscible polymers into a common polymer rich phase), a proportion of the liquid composition may also undergo binodal decomposition.

Binodal decomposition of the liquid composition is generally less preferred as this typically results in the sequential phase separation of each of the immiscible polymers into different polymer rich and polymer poor phases, which results in the formation of a phase separated polymer blend with a high interfacial surface area. Accordingly, the temperature of the liquid composition is reduced such that preferably at least 50% by volume, more preferably at least 65% by volume, most preferably at least 85% by volume undergoes spinodal decomposition.

In addition to reducing the temperature of the liquid composition to promote phase separation, a non-solvent may be introduced into the liquid composition to facilitate phase separation. Given that it will be necessary to ultimately remove most if not all solvent/non-solvent from the phase separated composition, the introduction of a non-solvent is less preferred.

Thermally induced phase separation (TIPS) is a known technique for producing porous polymers through the phase separation of liquid compositions. This technique may be conveniently applied in performing the method of the invention. TIPS is generally conducted by first dissolving a polymer in a solvent or solvent/non-solvent mixture and then lowering the temperature of the solution to induce liquid-liquid or solid-liquid phase separation. The phase separation results in polymer-rich and polymer-poor phases being formed within the solution. After solidifying one or both of the polymer-rich or polymer-poor phases, the polymer-poor phase is removed leaving a highly porous polymer structure.

Performing the invention using TIPS has a number of advantages over other techniques that may be used to promote phase separation of the liquid composition. TIPS is relatively simple to apply and can be performed at relatively low cost. The technique enables the pore morphology of the resulting porous polymer structure to be tailored through variation of processing parameters such as polymer concentration, solvent/non-solvent type, solvent/non-solvent ratios and thermal quenching strategies such as quenching temperature and quenching rate. The technique can also be applied using a diverse array of polymers and demonstrates the capability to produce porous polymers that are complex in shape, large in size and have thick cross sections.

A notable advantage of TIPS is that it can be used to prepare porous polymers with good interconnectivity of the pores. An interconnected pore morphology is desirable in many applications, for example in tissue engineering applications. In particular, desirable characteristics of polymer structures used in tissue engineering include a highly open porous and interconnected architecture with controlled pore size, porosity, pore shape and alignment to facilitate oxygen, nutrient and waste transfer as well as rapid, controlled vascularisation and tissue ingrowth.

In conducting TIPS, cooling parameters for the polymer solution play an important role in determining the morphology of the resultant porous polymer structure. During cooling of a polymer solution, solid-liquid phase separation can occur as a result of solvent freezing or polymer precipitation. A non-solvent may be included in the polymer solution to promote liquid-liquid phase separation. FIG. 1 represents a typical polymer solution phase diagram for a polymer-solvent/non-solvent system at a nominal polymer concentration. The Y-axis defines temperature, with T2 representing the glass transition temperature (Tg) of the polymer and T3 the solidification temperature of the solvent. These temperatures correspond to solid-liquid phase separation. The X-axis defines the solvent/non-solvent composition, with $S_1$ representing the solvent and $S_2$ representing the non-solvent $\phi_2$ defines the solubility limit of a polymer at a specific solvent composition, whereby the polymer is substantially insoluble in solvent compositions to the left of the limit, but soluble enough to form a solution in solvent compositions to the right of the limit.

The upper and lower parabolic-like curves in FIG. 1 are known as the binodal and spinodal curves, respectively. In regions defined above the binodal curve, the polymer solution exists as a stable single-phase system, whereas in regions below the binodal curve the polymer solution exists as a metastable or unstable two-phase system. In particular, the spinodal curve demarcates the two-phase region into metastable and unstable regions, with the metastable region being defined between the binodal and spinodal curves, and the unstable region being defined below the spinodal curve. The point Uc on the curves represents the maximum temperature at which spinodal decomposition may occur.

When the temperature of a polymer solution is reduced such that it passes from the single-phase region into the two-phase region, the solution may undergo phase separation by a nucleation and growth mechanism in the metastable region (binodal decomposition), or a spinodal decomposition mechanism in the unstable region. FIG. 1 illustrates the morphology of the two-phase separated systems that form through each phase separation mechanism. The nucleation and growth mechanism, which occurs in the metastable region, provides for isolated within a continuous phase domain spheroidal domains, whereas the spinodal decomposition mechanism, which occurs in the unstable region, provides for bi-continuous phase domains that give rise to interconnected pores.

The final morphology of a porous polymer structure formed by TIPS can be "fixed" by quenching the two-phase structure-formed composition to a temperature at or below the glass transition temperature of the polymer (T2 in FIG. 1) and/or at or below the freezing temperature of the solvent (T3 in FIG. 1) (herein after referred to as the "solidification temperatures"). Solvent/non-solvent can then subsequently be removed from the "fixed" porous polymer structure by sublimation, evaporation, or solvent extraction under appropriate conditions.

FIG. 1 also depicts a typical quenching regime which involves quenching the composition of the polymer solution defined at point X to point Y. Such a quenching regime will afford a porous polymer structure having a morphology which is at least in part derived through a spinodal decomposition mechanism. By this route, the polymer solution will generally first be heated to temperature T1 to provide for a single-phase polymer solution. The solution is then cooled to temperature T4, and in doing so passes through the metastable region (defined between the binodal and spinodal curves) and into the unstable region (defined below the spinodal curve). Under this regime, the cooling rate will be the dominant factor in determining the operative phase separation mechanism, and hence also the resulting pore morphology of the porous polymer structure. If the cooling rate is sufficiently fast, the polymer solution can quickly pass through the metastable region and into the unstable region, where phase separation will be dominated by a spinodal decomposition mechanism. In contrast, if the cooling rate is relatively slow, the solution may have enough time to form nuclei in the metastable region and phase separation may be dominated by a nucleation and growth mechanism. Accordingly, the temperature range defined by $\Delta T_1$ can also influence the operative phase separation mechanism. That is, where $\Delta T_1$ is large in passing from point X to point Y, the likelihood of at least some phase separation occurring by a nucleation and growth mechanism increases.

The practical operating window for performing the method of the invention using TIPS can vary as a function of temperature, polymer concentration, and/or solvent or solvent/non-solvent composition for a specific liquid composition. Phase diagrams can provide considerable detail on the relationship between temperature, polymer concentration, and solvent/non-solvent compositions for a given liquid composition. Such diagrams can therefore be used to assist in the preparation of an appropriate liquid composition for a given polymer/solvent or polymer/solvent/non-solvent system when performing the method of the invention. Phase diagrams for a number of polymer/solvent or polymer/solvent/non-solvent systems are generally known to those skilled in the art. However, where a specific phase diagram is not available, the curves can be determined by known techniques. For example, a suitable technique is described in Flory P. J. Principles of polymer chemistry, Ithaca: Cornell University Press, 1953; Olabisi O. Polymer-polymer miscibility, New York: Academic Press, 1979; Lloyd D. R., Kim S. S. and Kinzer K. E. Journal of Membrane Science 1991; 64(1-2):1-11; Kim S. S, and Lloyd D. R. Polymer 1992; 33(5):1047-57; and Flory P. J. Discussions of the Faraday Society 1970; No. 49(7-29.

To form the porous polymer blend structure in accordance with the invention, it will be necessary to solidify the at least two immiscible polymers in the common polymer rich phase. This solidification step must be conducted so as to avoid complete phase separation of the at least two immiscible polymers within the common polymer rich phase. In particular, upon phase separating the at least two immiscible polymers into the common polymer rich phase, each of the immiscible polymers will be prone to phase separating from the common polymer rich phase due to being in a thermodynamically unfavourable intimately blended state. Thus, in order to maintain a degree of molecular mixing between the at least two polymers, they must be solidified to in effect "fix" their thermodynamically unfavourable state and avoid their complete phase separation.

Where the phase separated liquid composition is at a temperature above the "solidification temperatures", solidification of the at least two immiscible polymers may be initiated by reducing the temperature of the liquid composition to below the glass transition temperature of the polymers and/or below the freezing temperature of the at least one common solvent.

Where the phase separated composition is at a temperature equal to or below the "solidification temperatures", the liquid composition will be in a supercooled state and therefore will not generally require further impetus to cause the at least two immiscible polymers to solidify. In other words, the at least two immiscible polymers in the common polymer rich phase will generally automatically solidify. It will be appreciated that the rate of such solidification will generally be greater as the temperature differential between the supercooled liquid composition and the "solidification temperatures" increases.

Typically, the rate at which the at least two immiscible polymers in the common polymer rich phase solidify will determine the degree of phase separation that occurs between these polymers. Through manipulation of the solidification rate (i.e. ageing time), the physical composition of the struts that make up the porous polymer structure can advantageously be tailored. Thus, a rapid rate of solidification that essentially provides little or no ageing of the common polymer rich phase can result in the substantially all of the immiscible polymers being fixed into a molecularly mixed state. If the solidification rate is reduced to enable the common polymer rich phase to age, a degree of phase separation of the immiscible polymers can occur. In this case, provided that complete phase separation of the immiscible polymers does not occur, it is possible to tailor the composition of the blend to have a proportion of one immiscible polymer "bleed" out from and onto the surface of the other immiscible polymer while still maintaining a degree of molecular mixing between the immiscible polymers at least at any interface that may form between them. Such blended structures have been found to exhibit superior mechanical properties compared with polymer blends formed by conventional techniques, and a varied surface topography and composition of the struts that make up the porous polymer structures.

In a preferred embodiment of the present invention the liquid composition comprising the at least two immiscible polymers dissolved in at least one common solvent is maintained at a temperature above the binodal temperature for the at least two immiscible polymers to form a homogenous solution. The temperature of this homogenous solution is then reduced to a temperature below the spinodal temperature of the at least two immiscible polymers at a rate that substantially avoids the formation and maturation of a binodal composition. By this process, it is believed that the at least the two immiscible polymers phase separate into a common polymer rich phase. The at least two immiscible polymers in the common polymer rich phase are then solidified using suitable processing conditions so as to avoid complete phase separation of the at least two immiscible polymers.

By performing the method of the invention it is believed that the resulting porous polymer blend will comprise a bi-continuous morphology (i.e. that derived through spinodal decomposition). Although generally less preferred, the porous structures may also comprise a discontinuous morphology (i.e. that derived through binodal decomposition).

Reference herein to a porous polymer blend having a "bi-continuous morphology" is intended to mean a porous polymer blend having a continuous polymer matrix interwoven with continuous voids or pores that afford an interconnected pore network. A porous polymer blend having a "discontinuous morphology" is intended to mean a porous polymer blend having generally isolated voids or pores within a continuous polymer matrix that typically does not afford an interconnected pore network.

Having "fixed" the phase separated morphology of the porous polymer blend, it will be necessary to remove the common polymer poor phase from the composition to form the porous structure. For example, the common polymer poor phase (which will typically comprise predominantly solvent or solvent/non-solvent) may be removed by extracting it with a further suitable solvent that is a non-solvent for the polymer structure. The relative miscibility or solubility of the common polymer poor phase in such a further solvent will, in part, determine its effectiveness in terms of the time required for extraction. The extracting or leaching process can be carried out at an elevated temperature below the softening point of the porous polymer blend structure to reduce the extraction time.

Removal of the common polymer poor phase may also be achieved by other known techniques. Illustrative examples of such techniques include, but are not limited to, evaporation and sublimation.

The process of removing the polymer poor phase will also generally remove some or substantially all of the at least one common solvent from the now "fixed" polymer blend structure and therefore prevent redissolution of the immiscible polymers at a later stage.

The time required to effect removal of the common polymer poor phase will vary depending upon the technique employed, the type of extracting solvent or non-solvent used, the temperature used and the degree of extraction required. In some instances, it may be unnecessary to extract all of the common polymer poor phase from the porous polymer blend structure. The amount of residual polymer, common solvent or common solvent/non-solvent from the common polymer poor phase that can be tolerated will primarily depend upon the requirements of the intended end use application of the porous polymer blend.

It will be appreciated from the foregoing, through manipulation of parameters such as the dissolved polymer concentration, the temperature quenching regimes, and ageing time of the common polymer rich phase, the invention advantageously enables the pore morphology and surface topography of the porous polymer structure, and the composition of the polymer blend per se that forms the porous structure, to be tailored.

Figure 2:
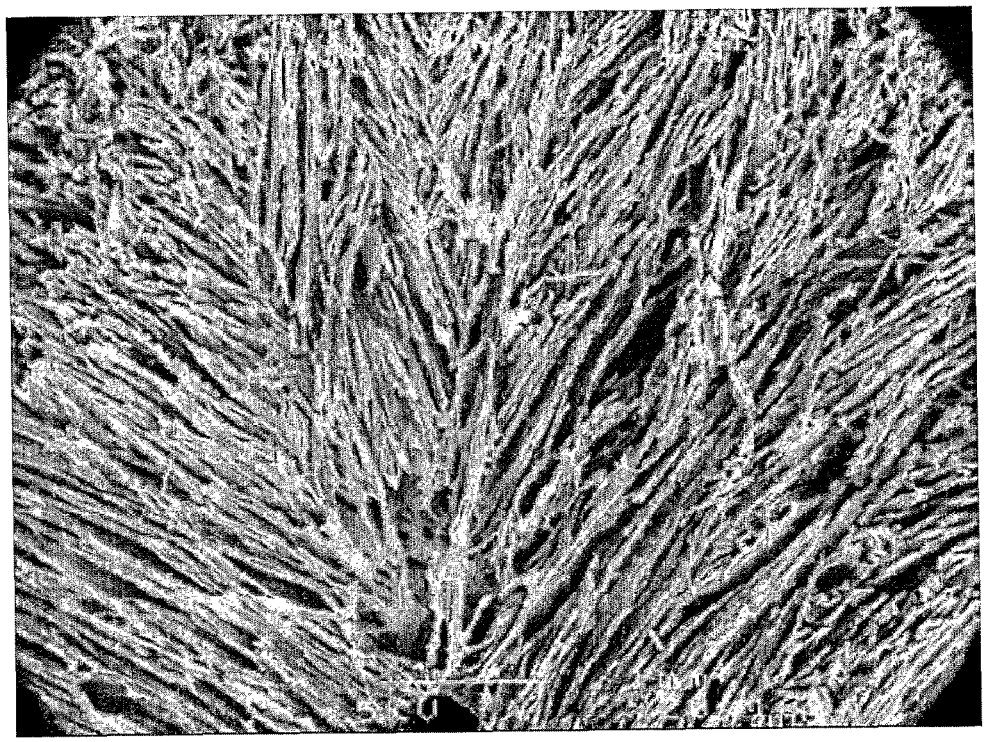
FIG. 2 shows an electron micrograph image of a porous polyurethane (PU)/poly(lactic-co-glycolic acid) (PLGA) scaffold prepared in accordance with the invention using a rapid quenching strategy.

For example, the bulk pore morphology of the porous polymer blend structure can be manipulated simply by changing the quenching regime used to promote phase separation of the liquid composition. Thus, with reference to FIG. 2, rapid quenching of a homogenous PLGA/PU/DMSO solution can induce a dendritic fibre-like gross morphology of the polymer blend that presents as a bi-continuous morphology with no discernible regions of a discontinuous morphology. In other words, the temperature of the liquid composition can be reduced sufficiently fast so that the composition primarily undergoes spinodal decomposition and the immiscible polymers phase separate into a common polymer rich phase. Through subsequent solidification of the polymer rich phase to avoid complete phase separation of the immiscible polymers, the resulting porous polymer structure is based on an intimate blend of the immiscible polymers.

Figure 3:
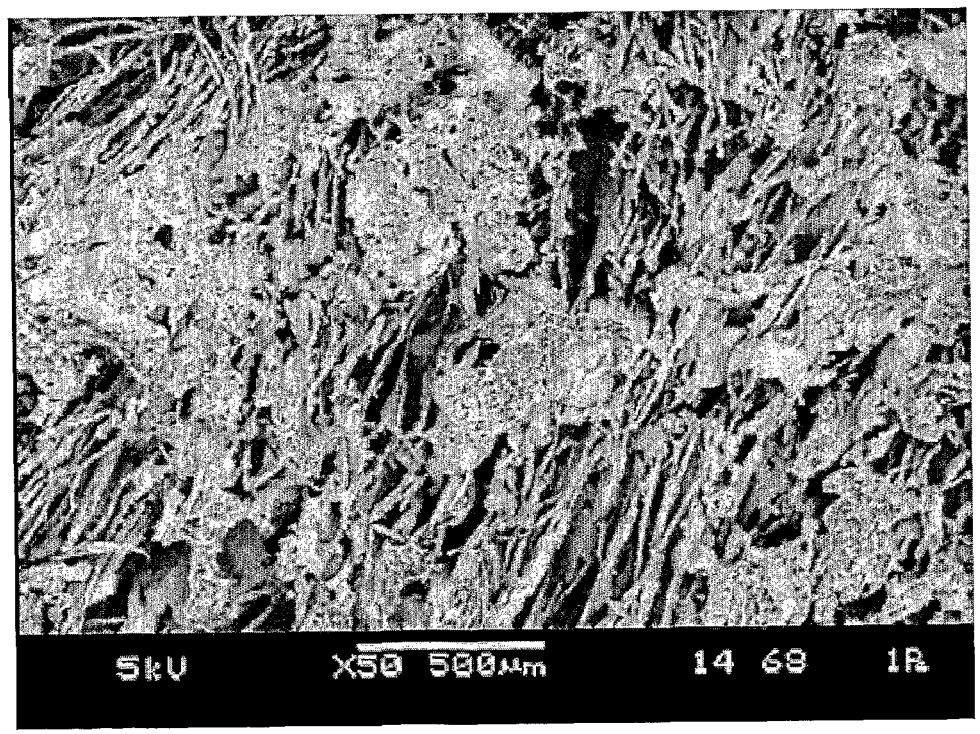
FIG. 3 shows an electron micrograph image of a porous PU/PLGA scaffold prepared in accordance with the invention using a slower quenching strategy than that used when preparing the scaffold shown in FIG. 2.

With reference to FIG. 3, by reducing the cooling rate of the liquid composition described immediately above, a proportion of the composition can undergo binodal decomposition which is characterised by initial formation of globules of one of the at least immiscible polymers followed by coating or deposition of the other immiscible polymer onto and around the globular polymer deposits. Thus, in FIG. 3 the resulting porous polymer morphology shows globules of polyurethane coating with PLGA having a discontinuous morphology, together with regions having a bi-continuous morphology as described in FIG. 2.

Figure 4:
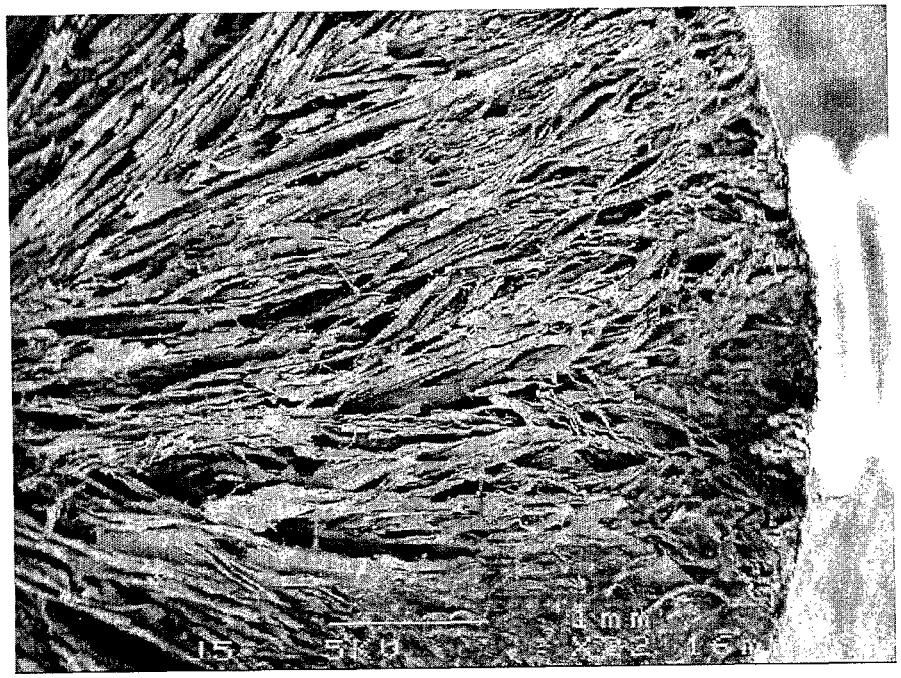
FIGS. 4 (×22) and 4A (×650) show an electron micrograph image of a PLGA/agarose scaffold produced in accordance with the invention.
Figure 4A:
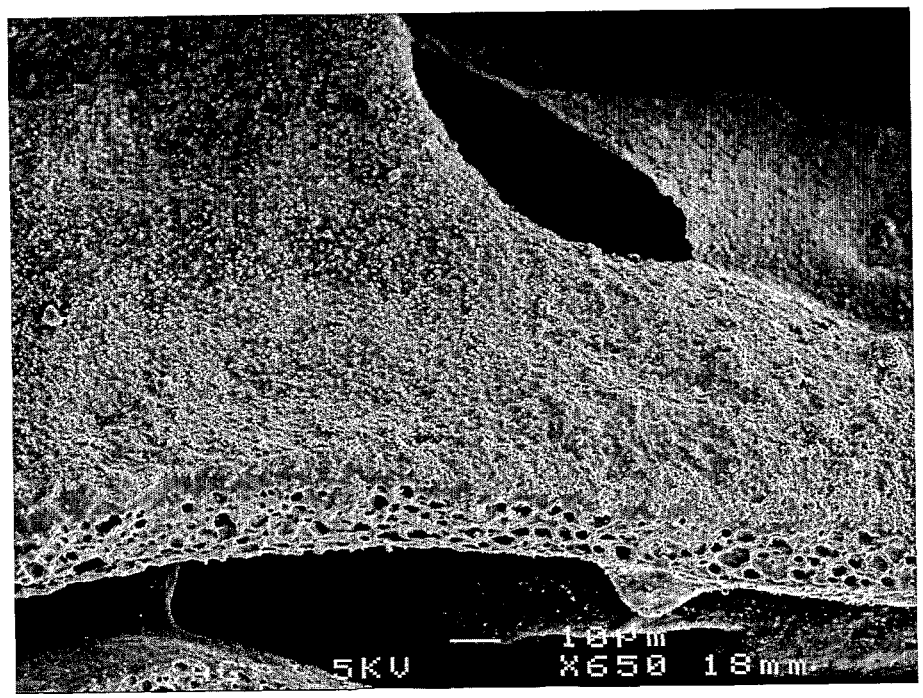

In addition to manipulating the pore morphology of the porous polymer blends, the surface topography of the struts that form the pores can also be manipulated. Thus, FIG. 4 shows a PLGA/agarose porous polymer blend scaffold produced in accordance with the invention having a bi-continuous morphology. In this case, the rate of solidification of the two immiscible polymers in the common polymer rich phase was sufficiently slow to enable a proportion of the agarose to phase separate from the PLGA to afford polymer struts having a surface topography coated with nano-sized nodules of predominantly agarose. Such structural features can be more clearly seen with reference to FIG. 4A, which is an enlargement of the structure shown in FIG. 4.

Figure 5:
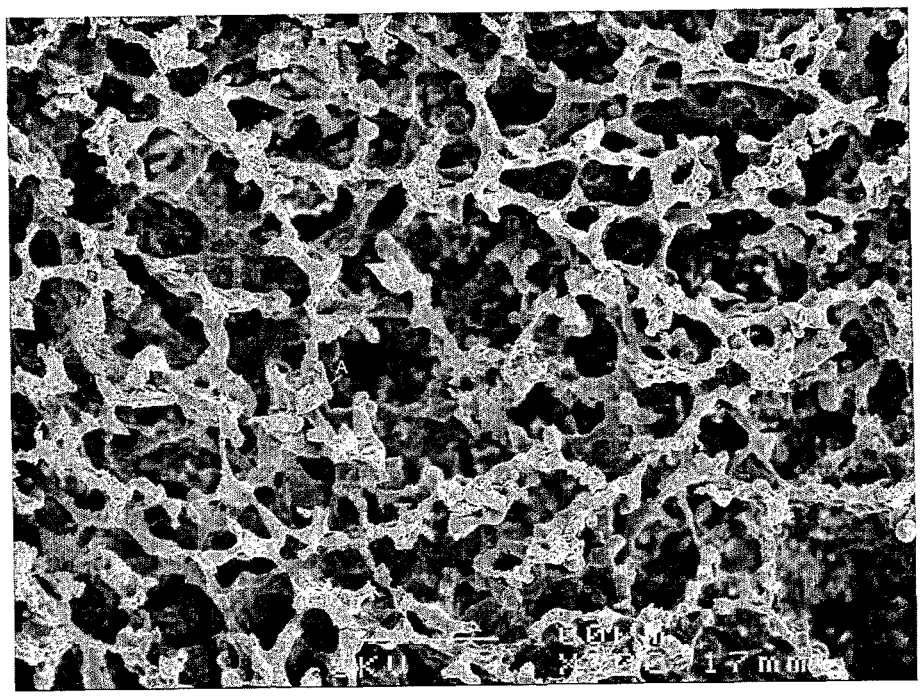
FIGS. 5 (×200) and 5A (×500) show an electron micrograph image of a PLA/chitosan scaffold produced in accordance with the invention.
Figure 5A:
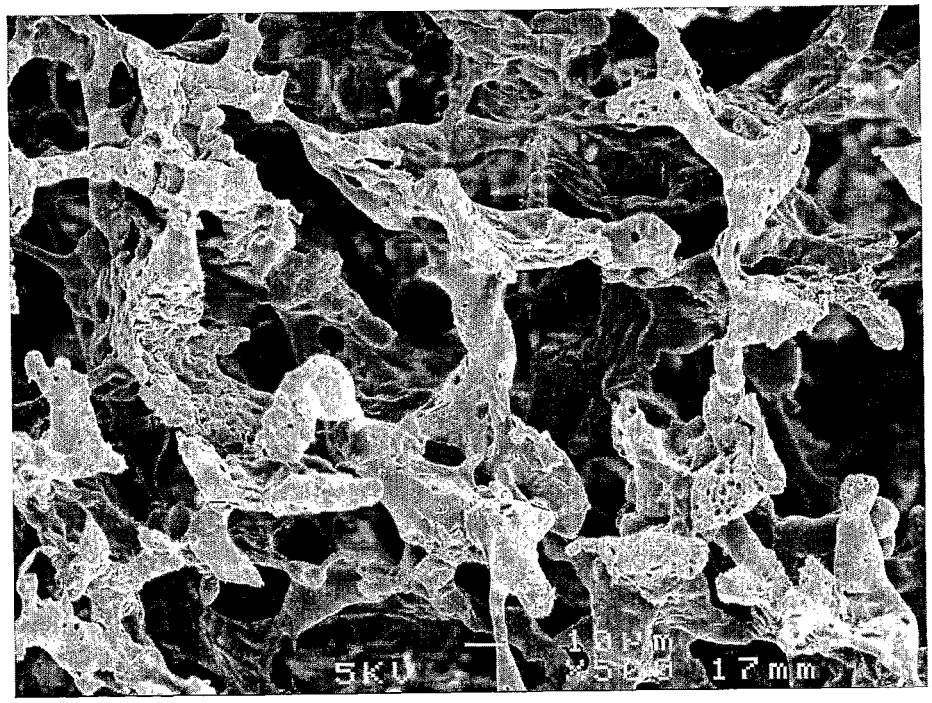

FIG. 5 shows a PLA/chitosan porous polymer blend scaffold produced in accordance with the invention which also exhibits a bi-continuous morphology. Notably, although produced using a similar quenching regime to that used in preparing the structure described in FIG. 4, the pore morphology of this porous polymer blend is different. Furthermore, as can be seen from the enlarged image of this scaffold in FIG. 5A, the surface topography of the struts that make up the pore structure are essentially smooth and uniform in appearance, indicating that little or no phase separation of the PLA and chitosan occurred during the solidification process.

Figure 6:
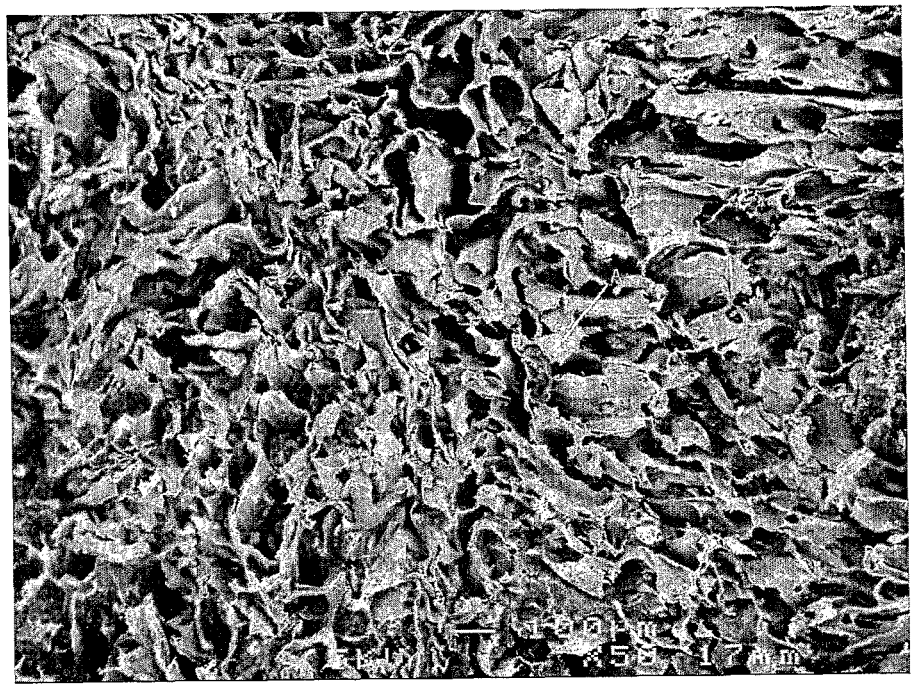
FIG. 6 shows an electron micrograph image of a PCL/PLGA scaffold produced in accordance with the invention.
Figure 7:
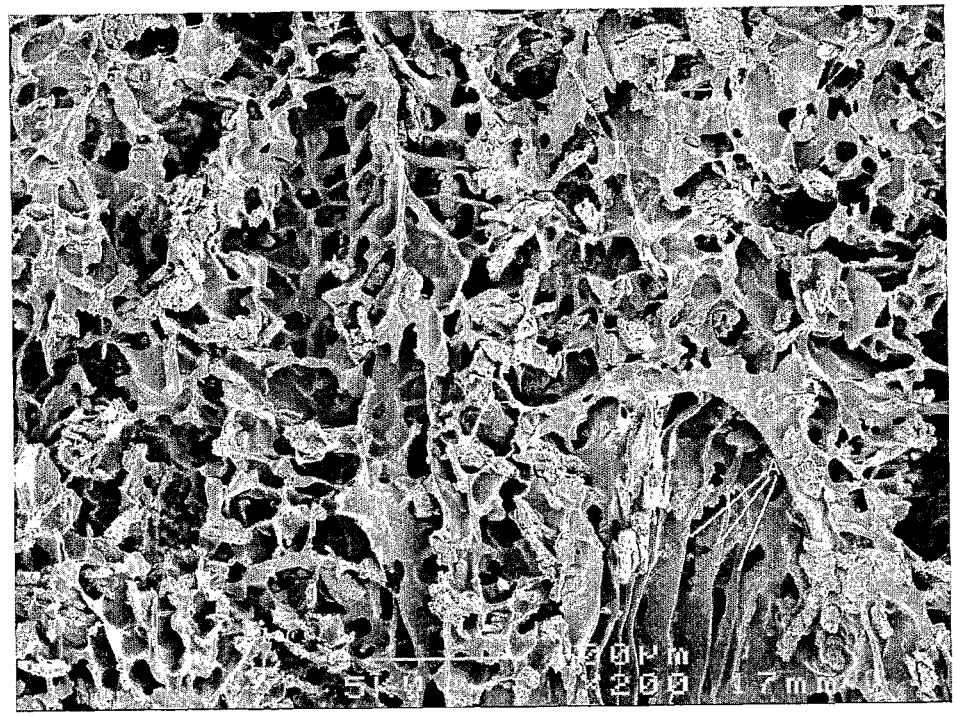
FIG. 7 shows an electron micrograph image of a PLGA/elastin scaffold produced in accordance with the invention.

FIGS. 6 and 7 show electron micrograph images of a PCL/PLGA and a PLGA/elastin porous polymer scaffold, respectively, produced in accordance with the invention. Notably, these porous polymer blend structures also exhibit a bi-continuous morphology that is different from the scaffolds shown in the other Figures.

Through an ability to minimise the interfacial surface energy between the immiscible polymers in the porous polymer blend structures prepared in accordance with the invention, the resulting increased mechanical strength and/or control thereof can enable the porous polymer blend structures to be used in tissue engineering applications that required either load bearing capacity or high elastic modulus, such as in joint replacement. It has also been found that the porous polymer blends in accordance with the invention can encourage and support cell adhesion throughout a polymer that would normally not present such behaviour through the incorporation of a proportion of polymer that does encourage such attachment or growth. Such properties make the porous polymer blends of the invention highly suitable for regeneration of damaged and/or diseased tissue, in both humans and animals.

Furthermore, it is believed that depending on the intended application of the porous polymer blend in an in vitro situation, the different morphologies that can be prepared could prove useful in giving rise to different structural tissues, e.g. in the regeneration of muscle tissues where a degree of orientation in a certain direction would be useful to encourage smooth muscle cell growth. This could be achieved by using a matrix with a microstructure similar to PLGA (for example), whereas for more random bulk tissues that do not need such orientation, such as fats for breast replacement purposes, a polyurethane-based scaffold may be employed. The mechanical properties of the underlying substrate will ultimately effect changes in cell responses above and beyond the effects of surface chemistry in many cases.

The porous polymer blend structures prepared in accordance with the invention may also comprise additives such as dyes, pigments, stabilisers, bioactive substances such as biologically or pharmaceutically active compounds.

Such additives can be added to the porous polymer blend structure after it has been prepared, for example by coating techniques. The coating may be applied through absorption, adsorption, and/or chemical bonding. Alternatively, the additives may be included in the liquid composition prior to the formation of the porous polymer blend structure. Generally it is preferred that the additives are incorporated in the porous polymer blend structure by this latter approach such that the additives are at least initially incorporated within the polymer matrix of the porous polymer blend structure (ie not simply located within the pores or on the surface of the pore structure). In this case, it may be desirable to select the common solvent or common solvent/non-solvent used in accordance with the invention to not only dissolve the two immiscible polymers but also the one or more additives.

Additives may include those known to encourage and/or facilitate bone formation such as hydroxyapatite and tricalcium phosphate.

The incorporation of additives in the porous polymer blend structure can be particularly advantageous when the structures are to be used in tissue engineering applications. For example, the structures may be provided with bioactive substances that function as receptors or chemoattractors for a desired population of cells.

In tissue engineering applications, it may be desired that the additive be incorporated for subsequent release in a controlled fashion. The additive may be released by bioerosion of the polymer phase, or by diffusion from the polymer phase.

Alternatively, the additive may migrate to the polymer blend structure surface to become active.

Bioactive additives may be provided in a physiological acceptable carrier, excipient, stabiliser, etc, and may be provided in sustained release or timed release formulations. The additives may also incorporate agents to facilitate their delivery, such as antibodies, antibody fragments, growth factors, hormones or other targeting moieties, to which the additives are coupled.

Acceptable pharmaceutical carriers for therapeutic use are well known in the pharmaceutical field, and are described, for example, in *Remington's Pharmaceutical Science*, Mac Publishing Co., (A. R. Gennaro edt. 1985). Such materials are generally non-toxic to recipients at the dosages and concentrations employed, and include diluents, solubilizers, lubricants, suspending agents, encapsulating materials, solvents, thickeners, dispersants, buffers such as phosphate, citrate, acetate and other organic acid salts, anti-oxidants such as ascorbic acid, preservatives, low molecular weight (less than about 10 residues) peptides such as polyarginine, proteins such as serum albumin, gelatin or immunoglobulins, hydrophilic polymers such as poly(vinylpyrrolindinone), amino acids such as glycine, glutamic acid, aspartic acid or argninine, monosaccharides, disaccharides, and other carbohydrates including cellulose or its derivatives, glucose, mannose or dextrines, chelating agents such as EDTA, sugar alcohols such as mannitol or sorbitol, counter-ions such as sodium and/or non-ionic surfactants such as tween, pluronics or PEG.

The additive may be covalently attached to polymers having pendent free carboxylic acid groups. Detailed chemical procedures for the attachment of various moieties to polymer bound free carboxylic acid groups have been described in the literature. See, for example, U.S. Pat. Nos. 5,219,564 and 5,660,822; Nathan et al., *Bio. Cong. Chem.*, 4, 54-62 (1992) and Nathan, *Macromolecules*, 25, 4476 (1992). These publications disclose procedures by which polymers having pendent free carboxylic acid groups are reacted with moieties having reactive functional groups, or that are derivatized to contain active functional groups, to form a polymer conjugate.

Hydrolytically stable conjugates may be utilised when the additive is active in conjugated form. Hydrolyzable conjugates may be utilised when the additive is inactive in conjugated form.

The amount of a given additive incorporated into the porous polymer blend structure will of course vary depending upon its nature and intended function. Those skilled in the art will readily appreciate such dosage requirements.

For porous polymer blend structures used in tissue engineering applications, a bioactive additive will generally be incorporated in order to provide optimal efficacy to the subject in need of treatment, typically a mammal. The dose and method of administration will vary from subject to subject and be dependent upon such factors as the type of mammal being treated, its sex, weight, diet, concurrent medication, overall clinical condition, the particular compounds employed, the specific use for which the compounds are employed and other factors which those skilled in the art will recognise. The porous polymer blend structures can be utilised in vivo as tissue engineering and tissue guided regeneration scaffolds in mammals such as primates, including humans, sheep, horses, cattle, pigs, dogs, cats, rats and mice, or in vitro. The polymer-drug combinations that may be prepared using the method of the invention can conveniently be prepared for storage under conditions suitable for the preservation of drug activity as well as maintaining the integrity of the polymer blend structure, and are typically suitable for storage at ambient or refrigerated temperatures.

Porous polymer blend structures prepared in accordance with the invention that will be used in tissue engineering and tissue guided regeneration applications must typically also be sterilised. Sterilisation of the structures can readily be accomplished by conventional techniques such as irradiation or treatment with gasses or heat.

Examples of biologically active compounds that may be used with the porous polymer blend structures include, but are not limited to, cell attachment mediators, such as the peptide containing variations of the "RGD" integrin binding sequence known to affect cellular attachment, biologically active ligands, and substances that enhance or exclude particular varieties of cellular or tissue ingrowth. Such substances include, for example, osteoinductive substances, such as bone morphogenic proteins (BMP), epidermal growth factor (EGF), fibroblast growth factor (FGF), platelet-derived growth factor (PDGF), insulin-like growth factor (IGF-I and II), TGF-$\beta$ and the like.

Examples of pharmaceutically active compounds that may be used with the porous polymer blend structures include, but are not limited to, acyclovir, cephradine, malfalen, procaine, ephedrine, adriomycin, daunomycin, plumbagin, atropine, quanine, digoxin, quinidine, biologically active peptides, chlorin $e_6$, cephalothin, proline and proline analogues such as cis-hydroxy-L-proline, penicillin V, aspirin, ibuprofen, steroids, nicotinic acid, chemodeoxycholic acid, chlorambucil, and the like. Therapeutically effective dosages may be determined by either in vitro or in vivo methods. For each particular additive, individual determinations may be made to determine the optimal dosage required. The determination of effective dosage levels, that is, the dosage levels necessary to achieve the desired result, will be within the ambit of one skilled in the art. The release rate of the additives may also be varied within the routine skill in the art to determine an advantageous profile, depending on the therapeutic conditions to be treated.

A typical bioactive additive dosage might range from about 0.001 mg/kg to about 1000 mg/kg, preferably from about 0.01 mg/kg to about 100 mg/kg, and more preferably from about 0.10 mg/kg to about 20 mg/kg, relative to weight of the mammal. The additives may be used alone or in combination with other therapeutic or diagnostic agents Porous polymer blend structures in accordance with the invention may be conveniently prepared using conventional TIPS processing techniques. Moulds used to form the porous polymer blend structure into a desired shape can be made from various materials such as glass, metal, ceramic and plastic.

Porous polymer blend structures in accordance with the invention may be used as separation or filtration materials, as absorbent materials and as scaffolds for catalysis, immobilisation of pharmaceutical compounds or biological molecules and tissue engineering.

The invention will hereinafter be described with reference to the following non-limiting examples.

EXAMPLES

Example 1

Formation of a PLGA/PU Porous Polymer Blend Scaffold

A solution of PLGA/PU in DSMO was prepared by dissolving 75/25 PLGA and polyurethane (PU) pellets (ElastEon PU 70A) in dry DMSO at a total polymer concentration of 5% w/w (i.e. 2.5% w/w PLGA, 2.5% w/w PU for the mixed solution).

The polyurethane pellets used in this example incorporating hard segments comprising 4,4'-methylenediphenyl diisocyanate, a mixture of butanediol and a short siloxane chain extender and soft segments comprising bis(hydroxyalkyl) polydimethyl siloxane (PDMS) and poly(hexamethylene oxide) (PHMO).

The PLGA/PU solution was heated to 90° C. and stirred for 24 hours to aid dissolution of the polymer to form a homogenous solution, before being pipetted into a 13 mm diameter glass vials with snap-on lids. The PLGA/PU solution was maintained at a temperature of 90° C. by wrapping an external heating element around the vial. The vial and heating element were then placed in a water bath at 5° C. for 24 hours to freeze or solidify the solution. The vial was then removed from the water bath and placed onto a mesh support in a beaker filled with ice and cold water to leach the DMSO from the solidified solution to result in an interconnected porous polymer blend/scaffold of the invention. Water and ice in the beaker was changed every hour for 3 hours and then every 2 hours until no visible solvent leaching was apparent. The final water/ice change was left for 24 hours. The scaffold was removed from the leaching beaker and vacuum dried at $10^{-2}$ mbar in its vial for 4 hours using a vacuum chamber and pump (Javac, DD300) to remove water, prior to being left to air-dry on tissue paper.

Example 2

Formation of a PLGA/PU Porous Polymer Blend Scaffold

A porous polymer blend scaffold was prepared as in Example 1 except with a slower quenching regime. In particular, the PLGA/PU solution was heated to 90° C. and stirred for 24 hours to aid dissolution of the polymer to form a homogenous solution before being pipetted into a 13 mm diameter glass vials with snap-on lids. The PLGA/PU solution was maintained at a temperature of 90° C. within the vial using a temperature controlled bath. The temperature of the polymer solution within the vial was then reduced from ~90° C. to ~60° C. over 20 seconds and thereafter the solution quenched to −5° C. by transferring it into another temperature controlled bath set at −5° C. for 24 hours to freeze or solidify the solution. The vial was then removed from the water bath and placed onto a mesh support in a beaker filled with ice and cold water to leach the DMSO from the solidified solution to result in an interconnected porous polymer blend/scaffold of the invention. Water and ice in the beaker was changed every hour for 3 hours and then every 2 hours until no visible solvent leaching was apparent. The final water/ice change was left for 24 hours. The scaffold was removed from the leaching beaker and vacuum dried at $10^{-2}$ mbar in its vial for 4 hours using a vacuum chamber and pump (Javac, DD300) to remove water, prior to being left to air-dry on tissue paper.

Examples 3 to 6

Formation of Other Porous Polymer Blend Scaffolds

Porous polymer blends of various structural morphologies were prepared from PLGA, agarose, and DMSO (Example 3); PCL, PLGA, and DMSO (Example 4); PLA, Chitosan and DMSO (Example 5); and PLGA, elastin and 1,4-dioxane (Example 6) liquid compositions in a manner similar to that described in Example 1, above, to result in the porous polymer blend scaffolds shown in FIGS. 4 to 7, respectively.

Comparative Example 1

Formation of a PLGA and a PU Porous Polymer Scaffold

For comparison purposes scaffolds of PLGA and PU were made from solutions of 5% w/w PLGA and 5% w/w PU, respectively dissolved in DSMO, were made in a similar manner to that described above in Example 1. The properties and characterisations of the PLGA/PU scaffolds and polymer solution of Example 1 were compared to the scaffolds and polymer solutions of PLGA and PU from this example, and are discussed in more detail below.

Determination of Polymer Solution Thermal Properties

The thermal properties of the respective polymer solutions, PLGA, PU and the PLGA/PU blend, were determined by a cloud point (CP) analysis and differential scanning calorimetry (DSC). The effect of PU concentration on cloud point behaviour was determined for 0.5%, 1%, 2%, 4%, 5% and 6% PU/DMSO (w/w) solutions and a 2.5% PU/2.5% PLGA/DMSO blend (w/w). A 5% PLGA/DMSO (w/w) solution was included in the cloud point experiment to determine the crystallisation temperature.

Cloud Point Measurements:

The CP was determined as follows: polymer solutions in sealed glass vials were placed in a water bath initially set at 80° C. and cooled at a rate of 0.1° C./min and the turbidity of the solutions was recorded by visual inspection until all cloud points and crystallisation temperatures had been determined.

The cloud point temperatures for the different concentration PU samples were found to be 59° C. (0.5%, 1.0% and 2.0%) and 66° C. (4.0%, 5.0% and 6.0%). The PU/PLGA blend had a cloud point temperature of 67° C. The 5% PLGA solution was found to crystallise at 11° C. Solvent freezing point depression was observed in the cloud point measurements and this is discussed in depth in more detail in the following section.

Figure 8A:
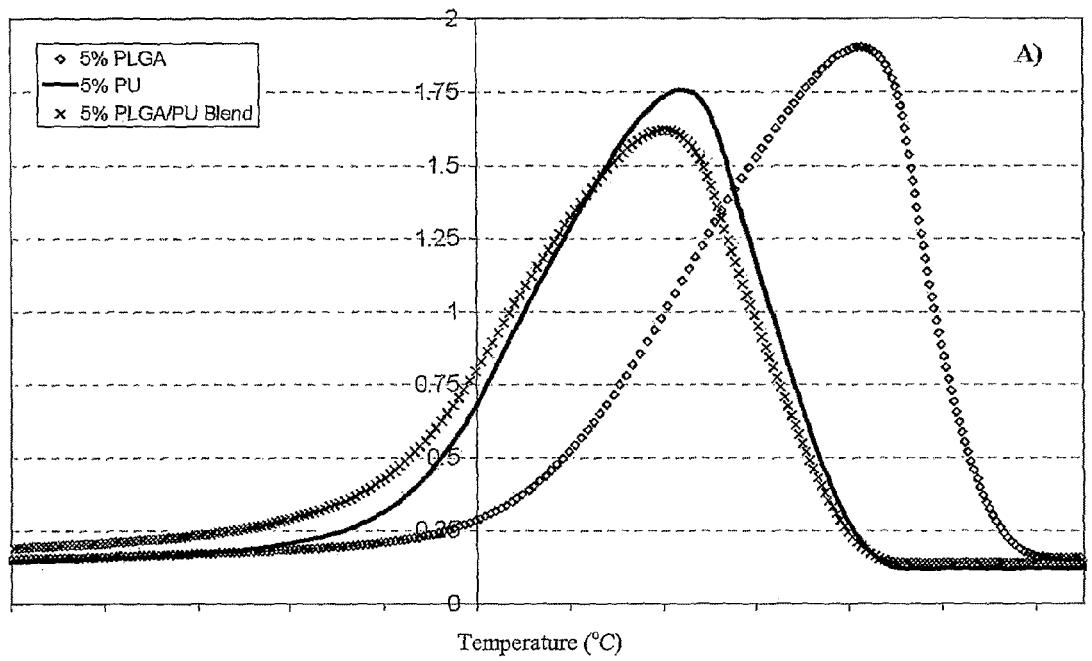
FIGS. 8A & B illustrate modulated DSC traces for freezing and melting peaks, respectively, of polymer solutions prior to forming a blend of the invention.
Figure 8B:
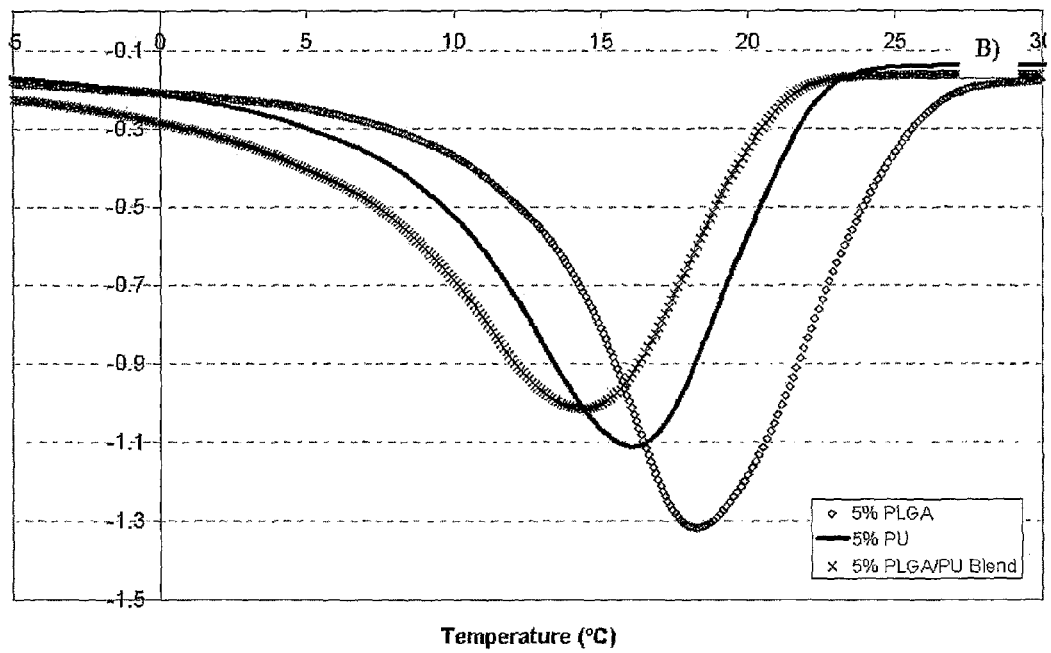

DSC Measurements:

Modulated DSC (TA2920 Modulated DSC, TA instruments, USA) was used to verify the cloud point data and to more precisely identify accurately the temperatures at which respective phase changes occur. The following thermal procedure was used: Sample equilibrated at 90° C., held isothermal for 5 minutes, cooled at 5° C./min to −90° C., heated at 5° C./min to 90° C. Temperature was modulated ±1° C. every 60 seconds. The results are summarised in FIGS. 8A & 8B For all three of the polymer solutions tested, the heat flow versus temperature data appears to be dominated by the solvent's thermodynamic cycles only, which are the only clearly observable transitions. Further inspection of the thermal traces detailed in FIGS. 8A & 8B have provided critical temperatures and overall heat flow associated with the freezing and melting events (see Table 1 below). While both the freezing and melting temperature was lower for the blended system, the heat flow for the blended system is between that of the two individual polymer systems. This can be explained by the fact that the PU concentration in the blend is only half the concentration in the pure PU scaffold used as a reference here.

TABLE 1

Freezing (Supercooling) and Melting Peak Temperatures and Heat Flows

| 5% Polymer Sample | Peak Temp (° C.) | Peak Heat Flow (J/g) | Onset of Transition (° C.) | Width of Transition (° C.) |
|---|---|---|---|---|
| *Freezing* | | | | |
| PLGA | 8.31 | 144.0 | 12.03 | 26.97 |
| PU | 4.34 | 130.6 | 9.08 | 41.56 |
| PLGA/PU Blend | 4.10 | 133.6 | 8.83 | 44.42 |
| *Melting* | | | | |
| PLGA | 18.25 | 146.6 | −15.08 | 44.52 |
| PU | 16.08 | 132.9 | −21.50 | 47.68 |
| PLGA/PU Blend | 14.30 | 134.7 | −31.88 | 56.67 |

Significant solvent freezing point depression is exhibited for all three polymer solutions, considering that pure DMSO freezes at 18.4° C. This behaviour was also observed in the cloud point experiments for PLGA. PLGA is easily dissolved in DMSO and therefore has a much higher level of interaction with the solvent than polyurethane, which takes over 10 times longer than PLGA to fully dissolve at the same temperature. It is this level of interaction that probably explains the observed difference in the magnitude of freezing point depression. Polymer chains tend to retain a lot of kinetic energy when in solution with a solvent and therefore require a lower temperature to induce solvent crystallisation. This explains the generic solvent freezing point depression behaviour exhibited for all three of the polymer solutions tested.

The onset of crystallisation for both the PU and PLGA/PU blended systems was very close (9.08° C. and 8.83° C., respectively) which is considerably lower than that of the PLGA-only system (12.03° C.). Similarly, the width of transition of both the PU containing systems were much closer to one another than that of a PLGA-only system indicating that PU phase separation plays a major role in determining both the onset and width of this transition. This can perhaps be explained by the differences in the heat capacity (Cp) of the polymers. The Cp of PLGA is 0.474 J/g° C. whereas for PU it is between 1.0-1.5 J/g° C. over the investigated temperature range. For the PU and PU/PLGA blended systems that exhibit liquid-liquid phase separation behaviour when cooled, it is possible that the PU phase acts as an energy store, thus the entire solution has more energy and requires a lower temperature to induce solvent freezing. The fact that the blend depresses the freezing point most of all is likely due to both the higher heat capacity of PU than PLGA and polymer-polymer interchain interactions.

Structural Morphology and Mechanical Testing of the Scaffolds.

A scanning electron microscope (SEM) (JEOL 6400LA, USA) was used to determine the morphology of the scaffolds. Cross sections of the scaffolds were coated with titanium using a sputter coater (Eiko IB5 Ion Coater, Japan) under an argon atmosphere using a sputter current of 60 mA. Samples were observed under the SEM at an accelerating voltage of 5 kV and pressure of 1 Pa. To facilitate in evaluating certain morphological features of the porous structures an elemental analysis feature on the SEM was used in some cases.

Scaffold Description and Morphology:

Quantitatively, under compression, PLGA scaffolds are typically hard and brittle while PU scaffolds are soft and elastic. The blended (PLGA/PU) scaffold exhibited properties somewhere in-between the two—not as rigid as pure PLGA, but not as elastic as pure PU. The PLGA scaffolds were found to possess a directional radial structure as a result of dendritic crystallisation of the DMSO. The structure possessed sheet-like fibres and formed finer fibres around the edges where cooling was more rapid. The pore sizes ranged from 0.1 to 200 µm. The PU scaffold was found to consist of random sheets of nonuniform size that were much smaller and more closely packed when compared with the PLGA scaffold, leading to a much denser structure. This structure is believed to result from the polymer solution undergoing liquid-liquid phase separation when cooled (prior to freezing of the solvent rich phase). There were very few micropores on the surface of these sheets, and no porous fibres as observed for PLGA.

The PLGA/PU scaffold formed in Example 1 (see FIG. 2) exhibited dendritic fibre-like gross bi-continuous morphology with no discernible regions of a discontinuous morphology.

In contrast, the structure formed in Example 2 (see FIG. 3) possessed a combination of the individual PLGA and PU discontinuous morphologies together with sections of bi-continuous morphology as described above for the structure shown in FIG. 2. The blend had a much larger number of small pores on the surface than either of the pure PLGA and PU scaffolds, with a similar diameter of between 0.1 and 1 µm. Furthermore, the porous nature of the fibre bundles was equivalent to the small pores on the surface (0.1-1 µm). While fibres similar to that observed in the pure PLGA scaffold are clearly evident, the most noticeable difference between the blended morphology and either of the pure samples is the presence of bundles of channels with structures that closely resemble the morphological structures found in the pure polyurethane PU. These channels are approximately 10 µm in diameter, and the number of channels varies between bundles.

The PLGA/agarose scaffold formed in accordance with Example 3 (see FIGS. 4 and 4A) exhibited a substantially uniformed bi-continuous morphology having a finely structured and compact radially extending arrangement.

The PLA/chitosan scaffold formed in accordance with Example 4 (see FIGS. 5 and 5A) exhibited a relatively open structure with the porous strut framework having a thin randomly arranged short rodlike structure.

The PCL/PLGA scaffold formed in accordance with Example 5 (see FIG. 6) exhibited a densely packed porous reed-like structure having a highly interconnected network with areas of additional porosity on the scaffold surfaces.

The PLGA/elastin scaffold formed in accordance with Example 6 (see FIG. 7) also exhibited a high interconnectivity of the porous structure with areas of directional sheets having a smooth scaffold framework.

Mechanical Testing of Scaffolds:

The Young's modulus of circular scaffold sections (13 mm diameter, 2 mm thick) taken from the respective scaffolds of Example 1 and Comparative Example 1 were determined using dynamic mechanical thermal analysis (DMTA IV, Rheometric Scientific) at a frequency of 1 Hz and an initial static force of 25 g force for PLGA and 10 g force for PU and the PLGA/PU composite scaffolds, these scaffolds being softer than the rigid PLGA scaffolds.

Among the three kinds of scaffolds, the PLGA scaffold had the highest Young's modulus (94 kPa) while the PU scaffold was the weakest scaffold (16 kPa). The blend exhibited mechanical properties in between (36 kPa). It should be pointed out that the 'modulus' being reported here is not the bulk modulus, but a porous modulus as the scaffolds have porosities of up to 95%. This is far from the ideal solid mass that is usually measured with texture analyser devices. However, there is good agreement between the measured moduli and the theoretical moduli, as calculated by using equation 1 to determine the Young's modulus of a foam from bulk properties [Gibson L J & Ashby M F, Cellular Solids, A. Wheaton & Co. Ltd, Exeter, Great Britain, 1988]. Scaffold density was calculated by assuming a negligible change in volume from the solution $$E^*/E_s = (\rho^*/\rho_s)^2 \quad (1)$$

Where:
E* Scaffold modulus
$E_s$ Young's modulus of bulk polymer (PLGA=45 MPa, PU=5 MPa)
$\rho^*$ Scaffold density (75.4 kg/m$^3$)
$\rho_s$ Density of bulk polymer (PLGA=1300 kg/m$^3$, PU=1100 kg/m$^3$)

The calculated moduli are 93 kPa and 15 kPa for pure PLGA and PU foams, respectively. These numbers are extremely close to the measured moduli of the scaffolds fabricated in this study. If we assume a linear blending rule, we note that the predicted modulus for the blended scaffold should be around 54 kPa. The measured value was 36 kPa, suggesting that such a rule is not applicable and that the PU characteristics dominate the mechanical response of these mixed scaffolds.

The effect frequency had on scaffold moduli was also briefly investigated. The frequency was increased from 1 Hz to 10 Hz. The results are shown in Table 2.

TABLE 2

| Frequency effects on Modulus | 1 Hz | 10 Hz | % Difference |
|---|---|---|---|
| PLGA | 132 kPa | 112 kPa | −15% |
| PLGA/PU Blend | 39 kPa | 49 kPa | 28% |
| PU | 14 kPa | 21 kPa | 46% |

For the blended and polyurethane samples, a higher frequency increased the modulus by 28% and 46%, respectively. For PLGA on the other hand, a higher frequency caused the modulus to decrease by 15%. Again, the blended system exhibits behaviour that is between the two extremes. The frequency effects can be explained by the fact PU is a soft and elastic polymer (containing hard and soft segments), which makes its modulus more frequency dependent than that of PLGA, which is brittle and hard. At higher frequencies the elasticity of the soft segments in the PU polymer chain tends toward stiff behaviour, causing the modulus to increase. Conversely, PLGA exhibits no elasticity, so we would not expect the modulus to change significantly with this small change in frequency and the observed decrease in modulus is believe to be a system error.

Example 8

Cell Adhesion and Growth

Cell Culture

Mouse embryo fibroblast NIH-3T3 cells from a frozen stock were incubated at 37° C. and 5% $CO_2$ using a medium containing Dulbecco's Modified Eagle Medium (DMEM) supplemented with 10% foetal bovine serum (FBS) and 50 μg/mL gentamycin to prevent microbial overgrowth. After 48 hours (~80% confluence) the growth medium was removed by aspiration, the cells washed with 10 mL of PBS and then detached from the plate using trypsin for 3 minutes. Fresh medium was then added to the culture dish to inactivate the trypsin. The cell culture was split into a new culture plate using 1 mL of the original culture as the seeding volume and 9 mL of fresh medium. This was repeated until the cells were needed for seeding. The total number of passages before seeding was 4. A viable cell count was performed using trypan blue dye.

Scaffold Seeding 2 mm thick scaffold sections (diameter 13 mm) from the respective scaffolds of Example 1 and Comparative Example 1 were placed into a Petri dish were sterilised by dripping 70% ethanol onto them. The sections were thoroughly rinsed with PBS followed by DMEM. The scaffold sections were then transferred to a 6-well plate and a 100 μL suspension of 3T3 cells at a concentration of 1×10$^6$ cells/mL was dripped onto each scaffold. The sections were then transferred to fresh wells which were filled with DMEM/10% FBS/50 μg/mL gentamycin. The plates were then incubated at 37C and 5% $CO_2$ for 48 hours. After incubation cell fixation was achieved by soaking the scaffold sections in 4% paraformaldehyde in PBS for 30 minutes.

Cell Morphology, Adhesion and Growth on Scaffolds

Laser scanning confocal imaging was used to obtain high resolution images of the cell morphology. The fluorescent dye used was propidium iodide, which is a membrane-impermeant dye that stains by intercalating into nucleic acid molecules. It binds both DNA and RNA and is thus ideal to use to locate not only nuclei, but also to garner an idea of the spread of the cytoskeleton. Slices ~0.2-0.3 mm thick were cut from the cell cultured scaffold sections. Slices were rinsed with 2× sodium saline citrate (SSC—0.3 M NaCl, 0.03 M sodium citrate at pH 7.0), a standard buffer used in the protocols given for the propidium iodide. Slices were then left for 5 minutes with 500 nM propidium iodide in 2×SSC and rinsed 3 times with fresh SSC buffer. The buffer was then replaced with a glycerol solution which is used as a mountant and gives rise to a good contact angle between the sample and the cover-slip. This brings the refractive index closer to that of the oil used for the immersion lens and also makes the sample somewhat more stable over time. The slice was transferred to a microscope slide and covered with a cover-slip, which was secured to the slide with nail polish to prevent movement during imaging. Oil was placed on the cover slip and a 40× immersion lens was used to image the cells on the scaffold slices.

Cell Attachment:

Cell attachment was performed qualitatively by looking at the cells morphology on the surface of each of the polymer scaffolds using confocal microscopy. From the confocal images it was clear that the cells were well spread throughout all scaffolds, indicating that cells were able to penetrate the entirety of the porous polymer network from top to bottom.

The dye used, propidium iodide, stains both RNA and DNA, with DNA found exclusively in the nucleus while RNA is found within the nucleus and the cytoplasm of the cell. The imaging showed the cytoskeleton of the cells and for all scaffolds the cells appeared to be relatively content growing on the surface of the polymers as they are well spread and showed multiple focal adhesion points. The multinucleated cell masses on the scaffolds show that the cells have divided, growing from the initial seeding point along the length of the pore network. While cell numbers were higher for polyurethane (discussed below), the cytoplasm was more rounded than that of the cells adhered to the PLGA and PU/PLGA blend scaffolds, indicating that cells were not quite as comfortable on polyurethane as they were on PLGA.

Cell Growth:

To ascertain a cell count on the scaffolds, nuclei were counted in the confocal images for a range of focal slices. The Z slice stepping size was set to 4 μm, which is around the average diameter of a nucleus (3-6 μm). Therefore, it is unlikely that any one nucleus will appear in more than one slice. It was thus possible to quantify the number of cells per section volume of scaffold by counting the number of nuclei that appear in each Z slice of the section and then dividing by the section volume. Care was taken when counting nuclei in that if it was obvious that the same nucleus was appearing in two consecutive slices it was only counted once.

Table 3 shows the number of cells per unit volume for each of the three scaffold types observed in the middle and at the edge of the sample slices.

The polyurethane scaffolds were shown to have the highest cell density, while the lowest cell density was recorded for the PLGA scaffolds. The mixed scaffolds were somewhere in-between the two. This is expected given that the mixed scaffolds will exhibit mixed cell-scaffold interaction properties of the two individual polymers given the presence of both surfaces throughout the scaffold. It is thought that scaffolds fabricated from PU had the highest cell density due to the fact that the PU scaffolds have more available surface area for cell attachment than the PLGA scaffolds. This is thought to be due to the denser structure of the PU constructs as seen in the SEM images rather than PU possessing a more favourable surface.

For all scaffolds, cell density was higher at the edges than in the middle which is understandable given that the scaffolds were seeded from the surface and cells have had to migrate into the bulk of the scaffold.

TABLE 3

Middle and Edge of Slice Cell Density

| Scaffold Type | Middle of Slice (Cells per mm 3) | Edge of Slice (Cells per mm 3) |
|---|---|---|
| PLGA | 3,540 | 4,710 |
| Polyurethane | 4,420 | 5,390 |
| PLGA/PU Blend | 3,780 | 4,720 |

Three dimensional reconstructions were created for each of the samples using the Z-layering capabilities of the confocal microscope.

The samples showed considerable cell growth in all three scaffolds from the initial seeding point and that this growth appears to be throughout the whole slice volume. There was also directional growth as the cells along the pore channels.

In summary, the pure PLGA scaffolds were found to possess a smooth, directional fibrous sheet-like structure with pore sizes of between 0.1 to 200 μm, have a porous Young's modulus of 93.5 kPa and were relatively brittle. The pure PU scaffolds were found to have an isotropic emulsion-like structure, a porous modulus of 15.7 kPa and were much more elastic than the PLGA scaffolds. The porous polymer blend scaffold of PLGA/PU exhibited morphological and mechanical properties in-between the scaffolds fabricated from the two individual polymers. The cellular adhesion and growth properties of 3T3 fibroblasts seeded onto these scaffolds also showed intermediate behaviour. The presence of PLGA throughout a PU scaffold gave rise to improved cell attachment and viability when compared to a scaffold fabricated from PU only. Thus the porous polymer blends of the invention were found to be highly suitable for use in tissue regeneration and tissue engineering.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The claims defining the invention are as follows:

1. A method of producing a porous polymer blend comprising:
    forming a liquid composition comprising at least two immiscible polymers dissolved in at least one common solvent;
    subjecting the liquid composition to a reduction in temperature to cause the at least two immiscible polymers to phase separate into a common polymer rich phase and a common polymer poor phase;
    solidifying the at least two immiscible polymers in the common polymer rich phase so as to avoid complete phase separation of the at least two immiscible polymers; and
    removing the common polymer poor phase to provide a blend of the at least two immiscible polymers having a porous morphology.

2. The method of claim 1 wherein the liquid composition is formed by heating the at least two immiscible polymers and the at least one common solvent to a temperature to dissolve the at least two immiscible polymers in the at least one common solvent.

3. The method of claim 2 wherein the liquid composition is heated to a temperature to dissolve all of the at least two immiscible polymers in the at least one common solvent.

4. The method of claim 2 wherein the liquid composition is formed and held at a temperature above the bimodal temperature of the at least two immiscible polymers.

5. The method of claim 1 wherein the rate of cooling of the liquid composition is sufficient to promote spinodal decomposition of at least a portion of the liquid composition.

6. The method of claim 5 wherein the rate of cooling is sufficient for at least 50% by volume of the liquid composition to undergo spinodal decomposition.

7. The method of claim 5 wherein the rate of cooling is sufficient for at least 65% by volume of the liquid composition to undergo spinodal decomposition.

8. The method of claim 5 wherein the rate of cooling is sufficient for at least 85% by volume of the liquid composition to undergo spinodal decomposition.

9. The method of claim 1 wherein the liquid composition further comprises a non-solvent, the at least two immiscible polymers being insoluble in the non-solvent.

10. The method of claim 9 wherein the non-solvent is at least partially immiscible with the at least one common solvent.

11. The method of claim 1 wherein the temperature at which the at least two immiscible polymers separate into a common polymer rich phase and a common polymer poor phase is above the solidification temperature of the at least two immiscible polymers in the common polymer rich phase.

12. The method of claim 11 wherein the common polymer rich phase is solidified by reducing the temperature of the liquid composition to below the glass transition temperature of the at least two immiscible polymers and/or below the freezing temperature of the at least one common solvent.

13. The method of claim 1 wherein prior to reducing the temperature of the liquid composition, the liquid composition is maintained at a temperature above the spinodal temperature of the at least two immiscible polymers to form a homogeneous solution.

14. The method of claim 13 wherein the temperature of the homogeneous solution is reduced to a temperature below the spinodal temperature of the at least two immiscible polymers at a rate that causes the at least two immiscible polymers to phase separate into the common polymer rich phase.

15. The method of claim 1 wherein the common polymer rich phase comprises at least 50 wt % of the total amount of the dissolved polymer in the liquid composition.

16. The method of claim 1 wherein the common polymer rich phase comprises at least 60 wt % of the total amount of the dissolved polymer in the liquid. composition.

17. The method of claim 1 wherein additives selected from the group consisting of dyes, pigments, stabilisers and bioactive substances are attached to at least one of the two immiscible polymers prior to forming the liquid composition.

18. The method of claim 1 wherein at least 0.5% (w/v) in total of the at least two immiscible polymers is soluble in the at least one common solvent.

19. The method of claim 1 wherein at least 1% (w/v) in total of the at least two immiscible polymers is soluble in the at least one common solvent.

20. The method of claim 1 wherein at least 2% (w/v) in total of the at least two immiscible polymers is soluble in the at least one common solvent.

21. The method of claim 1 wherein at least 5% (w/v) in total of the at least two immiscible polymers is soluble in the at least one common solvent.

22. The method of claim 1 wherein the total amount of the at least two immiscible polymers dissolved in the liquid composition relative to the total volume of the liquid composition is in the range of about 0.5 to about 50.

23. The method of claim 1 wherein the total amount of the at least two immiscible polymers dissolved in the liquid composition relative to the total volume of the liquid composition is in the range of about 1 to about 10.

24. The method of claim 1 wherein the total amount of the at least two immiscible polymers dissolved in the liquid composition relative to the total volume of the liquid composition is in the range of 2 to about 10.

25. A porous polymer blended structure formed by the method of claim 1.

26. A porous polymer blend comprising at least two immiscible polymers which do not form a homogeneous polymer mixture in the absence of a solvent, the at least two immiscible polymers being blended together and exhibiting the absence of complete phase separation.

27. The porous polymer blended structure of claim 26 wherein the at least two immiscible polymers form a blended polymer matrix, the blended polymer matrix including additives selected from the group consisting of dyes, pigments, stabilisers and bioactive substances.

* * * * *